United States Patent [19]

Kanamori et al.

[11] Patent Number: 5,734,904
[45] Date of Patent: Mar. 31, 1998

[54] METHOD AND SYSTEM FOR CALLING ONE OF A SET OF ROUTINES DESIGNED FOR DIRECT INVOCATION BY PROGRAMS OF A SECOND TYPE WHEN INVOKED BY A PROGRAM OF THE FIRST TYPE

[75] Inventors: Atsushi Kanamori; Jon Thomason, both of Redmond, Wash.

[73] Assignee: Microsoft Corporation, Redmond, Wash.

[21] Appl. No.: 338,646

[22] Filed: Nov. 14, 1994

[51] Int. Cl.$^6$ .................................................. G06F 9/445
[52] U.S. Cl. ............................................ 395/685; 395/651
[58] Field of Search ................................. 395/700, 375, 395/685

[56] References Cited

U.S. PATENT DOCUMENTS

| | | | |
|---|---|---|---|
| 4,542,453 | 9/1985 | Patrick et al. | 395/182.06 |
| 4,701,847 | 10/1987 | Nichols | 395/375 |
| 5,093,916 | 3/1992 | Karp et al. | 395/685 |
| 5,113,369 | 5/1992 | Kinoshita | 395/307 |
| 5,155,847 | 10/1992 | Kirouac et al. | 395/200.09 |
| 5,247,681 | 9/1993 | Janis | 395/685 |
| 5,274,819 | 12/1993 | Bloomfield-Brown | 395/670 |
| 5,297,282 | 3/1994 | Meilak et al. | 395/750 |
| 5,303,378 | 4/1994 | Cohen | 395/737 |
| 5,375,241 | 12/1994 | Walsh | 395/685 |
| 5,394,545 | 2/1995 | Emrick et al. | 395/621 |
| 5,410,698 | 4/1995 | Danneels et al. | 395/685 |

OTHER PUBLICATIONS

Kihlken, Tom, "The tiniest editor you'll ever need", PC Magazine, v7, n19, p. 281(16), Nov. 1988.
Munro, Jay, "Writing DLLS for Windows using Visual Basic, part 1", PC Magazine, v11, n11, p. 379(6), Jun. 1992.
Kennedy, Randall C., "Windows Sources", v1, n11, p. 334(2), Dec. 1993.
Pratt, Terrence W., *Programming Languages Design and Implementation,* Prentice–Hall, Inc., Englewood Cliffs, New Jersey, 1975, pp. 98–102.
Pietrek, Matt, "Q & A Windows" (Column) Microsoft Systems Journal, V9, n5 p. 63 (7) May 1994.
Duncan, Ray, "Power Programming: Creating a Custom Dictionary Module for Pen Windows" PC Magazine, V11, n6, p. 381(15) Mar. 31, 1992.
Oney, Walter, "Mix 16–bit and 32–bit Code in the Applications With the Win32s Universal Thunk", Microsoft Sys. Journal, Nov. 1993 v8n11p. 39.
Shaw, Richard, "32–bit Visual C++ Makes NT Coding Easier", PC Magazine Nov. 9, 1993 v12 n19 p. 40 (1).
Lindeman, Terry, "Run 32–bit Apps Under Windows 3.1 With Win32s", The CompuThink Windows Watcher, Nov. 1992 v2 n11 p. 15.
No Author Given "Windows Apps to OS/2: Micrografix Mirror Toolkit for Windows" EDGE: Work–Group Computing Report Nov. 20, 1992 v3 n131 p. 9(1).

*Primary Examiner*—Alvin E. Oberley
*Assistant Examiner*—St.-John Courtenay, III
*Attorney, Agent, or Firm*—Seed and Berry LLP

[57] ABSTRACT

A method and system for providing a set of routines that may be invoked by programs of two or more types is provided. In a preferred embodiment, a group of libraries that each are able to be called by programs of a different one of the types is provided. Each of the routines is provided by a function in one of the libraries. The method and system causes all of the libraries of the group to be loaded when any of the libraries of the group are loaded. In order to invoke a routine, a program calls a function in the library of the group that is able to be called by programs of its type. If the routine is provided by a function in this library, the library provides the routine itself. If the routine is provided by a function in another library of the group, the library calls the function that provides the routine in another library of the group. In a preferred embodiment, the library causes a calling instruction to be written into the library which calls the function that provides the routine in another library of the group in order to enable the library to call the function that provides the routine in another library of the group. In a further preferred embodiment, other libraries of the group are actually loaded only when one of their functions is called to provide a routine of the set.

21 Claims, 24 Drawing Sheets

METHOD AND SYSTEM FOR CALLING ONE OF A SET OF ROUTINES DESIGNED FOR DIRECT INVOCATION BY PROGRAMS OF A SECOND TYPE WHEN INVOKED BY A PROGRAM OF THE FIRST TYPE

TECHNICAL FIELD

The invention relates generally to a method and system in a computer system for providing library routines, and, more specifically, to a method and system for providing a set of routines that may be invoked by programs of two or more types.

BACKGROUND OF THE INVENTION

Libraries are groups of general-purpose routines that perform functions that may be useful to many different programs. It is common for programmers to design programs that call library routines in order to exploit the useful functions performed by the library routines without having to generate the code that performs those functions. Libraries may be divided into static libraries and dynamic libraries. Static libraries are linked once to each program that uses them during the development of the program, before the program is ever executed. Dynamic libraries, or DLLs, on the other hand, are linked automatically to programs that call them when such a program is executed. Dynamic libraries have achieved common use, because (A) a dynamic library may be shared by different programs that are using the dynamic library at the same time, requiring only a single copy of the dynamic library in memory instead of requiring a copy for every program; and (B) an old version a dynamic library may be easily replaced with a new version by replacing the file containing the old version with a file containing the new version. The programs that use a static library, on the other hand, are inextricably linked to the old version, and must be relinked to the new version in order to use the new version.

Dynamic libraries are designed to be loaded and called by other programs, or executable modules, such as application programs (applications) or other libraries. An application or library that calls a dynamic library is referred to herein as a "calling module." The dynamic library called by a calling module is called the "target library." The code for every calling module for a particular target library must contain an instruction requesting that an operating system component, known as the loader, load the target library. When the loader receives a request to load a target library, the loader first determines whether the target library is already in memory and accessible to the calling module. If the target library is not already in memory and accessible to the calling module, then the loader retrieves the target library from secondary storage, stores the target library in memory, and initializes an reference count associated with the target library that indicates the number of times a calling module has requested to load the target library to one. If the target library is already in memory and accessible to the calling module, then the loader merely increments the target library's existing reference count. The loader also provides to the calling module the address in memory at which the target library is stored, so that the calling module can determine the actual addresses of the functions in the target library in order to call them. When a calling module is terminating, or when it has determined that it will no longer be using a target library, the calling module executes an instruction requesting that the loader unload the target library. When the loader receives a request to unload a target library, the loader decrements the reference count for the target library. If the decremented reference count is equal to zero, then the requesting calling module was the only calling module still using the target library, and the loader removes the target library from memory. If the decremented reference count is greater than zero, then calling modules other than the requesting calling module are using the target library, and the loader does not remove the target library from memory.

Certain of the processors upon which modern computers are based support multiple words sizes. For instance, the microprocessors in the Intel 80386/80486/Pentium™ series support both a 16-bit mode, in which words are comprised of 16 bits, and a 32-bit mode, in which words are comprised of 32 bits. In the 16-bit mode, programs written for 16-bit word size may execute; in the 32-bit mode, programs written for 32-bit word size may execute. While many operating systems are designed to operate such processors exclusively in a single word size mode, and thereby execute programs written for a single word size exclusively, it would be desirable for an operating system to switch such a processor between multiple word size modes in order to enable the execution of programs written for each word size. Specifically, it would be desirable for an operating system to switch the Intel series of microprocessors between 16-bit mode and 32-bit mode, in order to enable the execution of program modules written for both 16-bit word size and 32-bit word size, discussed herein as 16-bit modules and 32-bit modules, respectively.

In an operating system under which both 16-bit modules and 32-bit modules may execute, the scheme for loading dynamic libraries discussed above may be extended to permit 16-bit modules to utilize 16-bit dynamic libraries and 32-bit modules to utilize 32-bit dynamic libraries. Specifically, such an operating system would contain a 16-bit loader, invocable by a 16-bit calling module to load 16-bit target libraries. A 16-bit calling module could further use a standard 16-bit calling instruction to call functions in a loaded 16-bit target library. Similarly, such an operating system would contain a 32-bit loader, invocable by a 32-bit calling module to load 32-bit target libraries. A 32-bit calling module could further use a standard 32-bit calling instruction to call functions in a loaded 32-bit target library.

However, in an operating system under which both 16-bit modules and 32-bit modules may execute, it would also be useful to enable 16-bit modules to call 32-bit libraries, since this would enable the designers of 16-bit libraries to update their libraries to 32-bit libraries, which would remain compatible with existing 16-bit modules that presently call the 16-bit library. It would further be useful to enable 32-bit modules to call 16-bit libraries, since this would enable the designers of new 32-bit modules to utilize existing libraries that are only available in 16-bit form. Attempts to enable programs of one word size to call libraries of the other word size are hampered by the facts that compilers for calling modules of one word size cannot create calling instructions to functions in libraries of the other word size, that parameter values are formatted differently for functions in libraries of different word size, that calling modules of one word size can only utilize the loader for that word size which can only load libraries of that word size, and that it is impractical to require that a calling module of one word size be modified in order to be able to call a library of the other word size.

SUMMARY OF THE INVENTION

It is an object of the invention to provide a method and system in a computer system for providing a set of routines that may be invoked by programs of two or more types.

It is another object of the invention to provide a method and system in a computer system for providing a set of routines that may be invoked by programs of two or more types on an as-needed basis.

It is yet another object of the invention to provide a method and system in a computer system for rewriting executable code to contain instructions not generatable by the compiler that generated the executable code.

It is a further object of the invention to provide a method and system in a computer system for rewriting reentrant code.

These and other objects, which will become apparent as the invention is more fully described below, are provided by a method and system for providing a set of routines that may be invoked by programs of two or more types. In a preferred embodiment, a group of libraries that each are able to be called by programs of a different one of the types is provided. Each of the routines is provided by a function in one of the libraries. The method and system causes all of the libraries of the group to be loaded when any of the libraries of the group are loaded. In order to invoke a routine, a program calls a function in the library of the group that is able to be called by programs of its type. If the routine is provided by a function in this library, the library provides the routine itself. If the routine is provided by a function in another library of the group, the library calls the function that provides the routine in another library of the group. In a preferred embodiment, the library causes a calling instruction to be written into the library which calls the function that provides the routine in another library of the group in order to enable the library to call the function that provides the routine in another library of the group. In a further preferred embodiment, other libraries of the group are actually loaded only when one of their functions is called to provide a routine of the set.

DETAILED DESCRIPTION OF THE INVENTION

Figure 1:
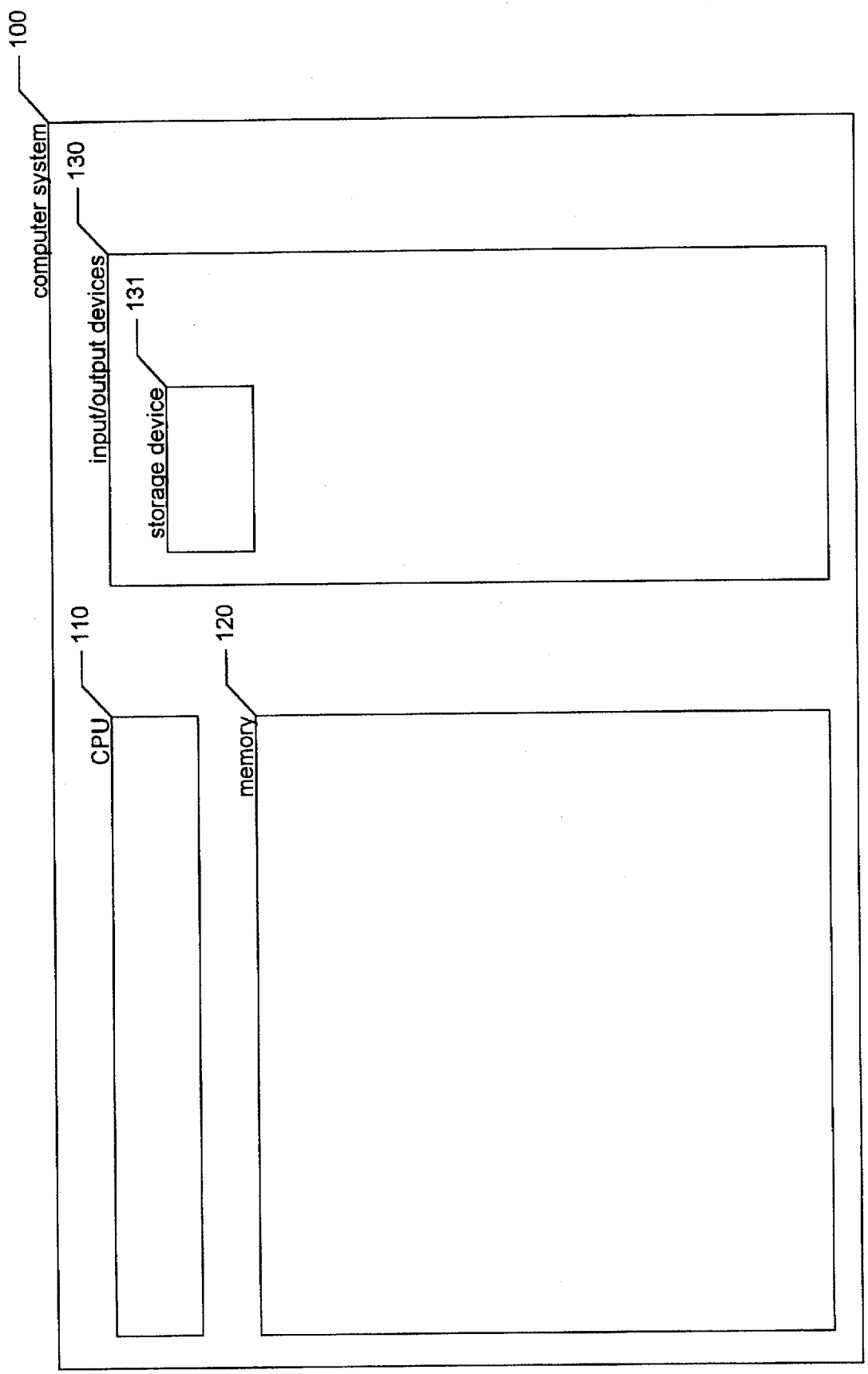
FIG. 1 is a high-level block diagram of the general-purpose computer system upon which preferred embodiments of the invention preferably operate.

I. Introduction
II. Synchronizing a Library Pair
  A. Synchronization Generally
    1. Loading
    2. Unloading
  B. Synchronization Where an Initialization Routine is Called Only Once
  C. Synchronization on an As-Needed Basis
III. Rewriting Thunk Calls
IV. Conclusion I. Introduction A method and system for providing a set of routines that may be invoked by programs of two or more types is provided. Preferred embodiments of the invention provide a set of routines that may be invoked by both programs of a first type and programs of a second type by providing each routine of the set in either a library that may be called by a program of the first type or in a library that may be called by a program of the second type. Preferred embodiments of the invention cause both libraries to be loaded when either of the libraries is loaded, and the library in which a particular routine is not provided to be rewritten to contain a call to the routine in the other library. While the invention is discussed in the context of providing a set of routines that may be invoked by both program modules written for 16-bit word size (16-bit modules) and programs written for 32-bit word size (32-bit modules), it will be recognized by those skilled in the art that the techniques of the invention may be gainfully applied to other pairs of disparate program types.

In a preferred embodiment, a computer system, having both a microprocessor and an operating system, is provided that is capable of executing 16-bit modules and 32-bit modules. 16-bit modules may invoke a 16-bit loader contained by the operating system in order to load dynamic libraries of routines written for 16-bit word size (16-bit libraries). Similarly, 32-bit modules may invoke a 32-bit loader contained by the operating system in order to load dynamic libraries of routines written for 32-bit word size (32-bit libraries).

According to the invention, in order to provide a set of routines that may be invoked by both 16-bit modules and 32-bit modules, a library developer creates a thunking pair of libraries ("pair"), comprised of a 16-bit library and a 32-bit library. Both libraries of a pair contain functions corresponding to each routine of the set. For each routine, the function in one library of the pair contains actual code for the routine and is called the "actual function" for the routine, while the function in the other library of the pair contains a reference, or "thunk call," to the actual function in the first library of the pair and is called the "thunking function" for the routine. In order to invoke one of the routines in the set, an executable module of a particular word size calls the function for the routine in the library of the pair of the same word size as the calling module (the "same-size library"). If the function in the same-size library is the actual function for the routine, calling the function in the same-size library provides the invoked routine. If, on the other hand, the function for the routine in the same-size library is the thunking function, calling this function executes the thunk call that it contains, which causes the actual function for the invoked routine in the other library of the pair (the "different-size library") to be called to provide the invoked routine.

In a particular library pair, all of the actual functions may be contained in one of the libraries of the pair, or they may be divided between the libraries of the pair. Because either member of a pair can contain thunking functions, loading one library of a pair creates a potential dependency on the other library of the pair. For this reason, while one library of a pair is loaded into memory, the invention preferably ensures that the other library of the pair is also loaded into memory. This aspect of the invention is referred to as synchronizing a library pair. In a preferred embodiment of the invention, the operating system is modified to contain two special "kernel" modules, which each may be called by modules of one word size and may call modules of the other. When an calling module of either word size that uses routines of the set executes, it causes the loader of the word size of the calling module to load the same-size library. When the loader loads the same-size library, it causes an initialization function of the same-size library to be executed. The developer of the library pair adds an instruction to the initialization routine for calling the appropriate kernel module, which determines whether the library was loaded by the other library of the pair, or by another module. If the kernel determines that the library was loaded by a module other than the other library of the pair, the kernel calls the loader of the word size of the other library of the pair to load the other library of the pair. As is discussed further below, in a preferred embodiment, the kernel contains special logic for synchronizing the libraries of a pair when the loader of a particular word size only executes the initialization routine of a library when the library is loaded for the first time. Synchronization also involves unloading the library of the pair of a different word size than the calling module when the library of the pair of the same word size as the calling module is unloaded, as is discussed in more detail below.

Once a pair of libraries is synchronized such that both libraries of the pair have been loaded, the calling module may invoke any routine of the set by calling the function for it in the same-size library. If the called function in the same-size library is the actual function for the invoked routine, it executes to provide the invoked routine. If the called function in the same-size library is the thunking function for the invoked routine, it executes its thunking call to call the actual function in the other library of the pair. Because library developers typically develop libraries using standard 16- and 32-bit compilers, however, the thunking calls in the thunking functions of a library cannot initially be compiled as calls to functions of the other library of the pair. For this reason, the thunking call of each thunking function is preferably compiled as a call to a thunk call rewriting routine in the kernel. The thunk call rewriting routine modifies the executable code of the called thunking function in the same-size library to call the corresponding actual function in the other library of the pair. As is discussed in greater detail below, the rewriting technique employed in the preferred embodiment of the invention is reentrant, ensuring that it works properly in multi-threaded environments.

FIG. 1 is a high-level block diagram of the general-purpose computer system upon which preferred embodiments of the invention preferably operate. The computer system 100 contains a central processing unit (CPU) 110, a computer memory (memory) 120, and input/output devices 130. Among the input/output devices is a storage device 131, such as a hard disk drive. The computer programs that preferably comprise the preferred embodiment reside in the memory, as shown in greater detail in the memory diagrams of FIGS. 2A–2I, 5, and 13A–13G, and execute on the CPU. While the preferred embodiment is preferably implemented on a computer system configured as described above, one skilled in the art will recognize that it may also be implemented on computer systems having different configurations.

II. Synchronizing a Library Pair

A. Synchronization Generally

1. Loading

According to the invention, the libraries of a pair are preferably synchronized in order to enable thunking calls from one library of the pair to the other. The synchronization scheme discussed in conjunction with FIGS. 2A–2I and 5 below assumes the existence of conventional operating system loader modules for loading and unloading 16-bit libraries and 32-bit libraries. The synchronization scheme depends on (A) a special library initialization routine in each library of the pair that, in addition to performing conventional initialization activities, calls a special kernel operating system module when the special initialization routine is invoked by the loader; and (B) two special kernel operating system modules, each of which, when it is called by a library's initialization routine, determines whether the library was loaded by the other kernel in order to synchronize the pair, and, if not, calls the appropriate loader to load the other library of the pair.

FIGS. 2A–2H are memory diagrams showing the contents of the memory 120 that are relevant to providing the set of routines throughout the course of synchronizing a library pair comprising a 32-bit library and a 16-bit library. Initial contents of the memory include a loading log 201 for storing indications of libraries loaded and unloaded in response to requests from the kernels, which is itself preferably stored within a thread information block, which contains a variety of information relating to a particular execution thread. Initial contents of the memory also include executable modules ("modules"). The modules shown are divided into 32-bit modules on the left, which may generally only be called by other conventional 32-bit modules, and 16-bit modules on the right, which generally only may be called by other 16-bit modules. Modules shown with four open circles at their corners are normal 32-bit modules, compiled with a conventional 32-bit compiler, which can call and be called by other 32-bit modules. Modules shown with four closed circles at their corners are normal 16-bit modules, compiled with a conventional 16-bit compiler, which can call and be called by other 16-bit modules. The kernels, shown with two open and two closed circles at their corners, are compiled with a special compiler, permitting them to be called by modules of one word size and call modules of the other word size. For example, the 32-bit kernel can be called by 32-bit modules, and may call 16-bit modules. The diagrams show a 32-bit calling module 210, such as a 32-bit application program, requesting that the operating system load a 32-bit library. The calling module may also be a library, an operating system module, or a 32-bit module of another type. It is important to note that, although this example and others hereafter may show only 32-bit calling modules, the invention and its various embodiments are specifically designed to accommodate calling modules of either word size. The operating system, enclosed by wavy lines, includes a conventional 32-bit loader 220 for loading 32-bit libraries and a conventional 16-bit loader 270 for loading 16-bit libraries. The operating system further includes a special 32-bit kernel 225 and a special 16-bit kernel 275 for managing the synchronization of library pairs.

Figure 2A:
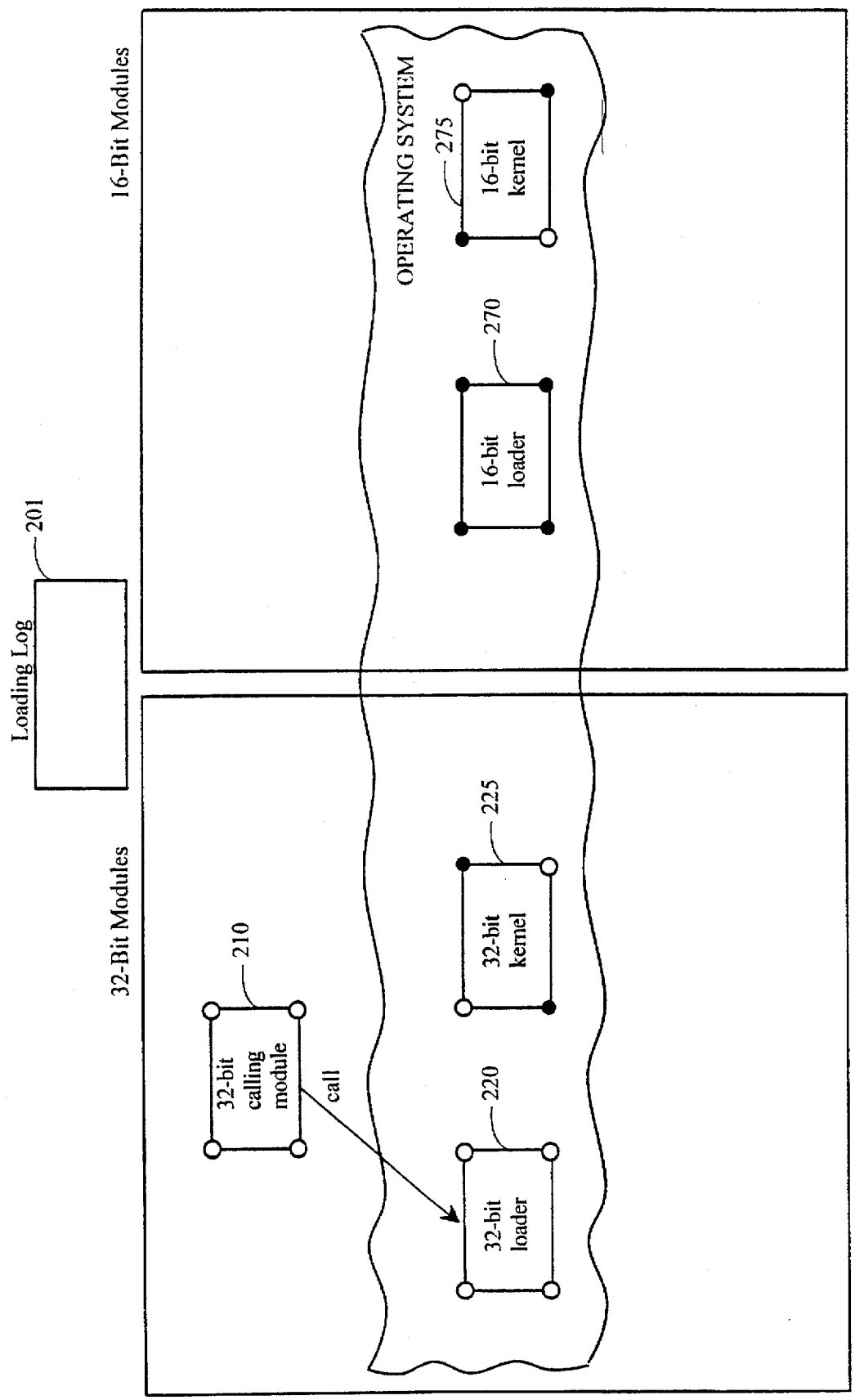
FIGS. 2A–2H are memory diagrams showing the contents of the memory 120 that are relevant to providing the set of routines throughout the course of synchronizing a library pair comprising a 32-bit library and a 16-bit library.

FIG. 2A is a memory diagram showing the initial state of contents of the memory 120 that are relevant to providing the set of routines. The diagram shows the 32-bit calling module calling the 32-bit loader with a request to load the 32-bit target library. The calling module calls the loader when it identifies the possibility that it may invoke routines of the set represented by the pair of libraries of which the loaded library is a member. This is often done as part of the initialization activity of the calling module. In some cases, the operating system itself may make the call after loading the calling module and determining that it contains calls to functions in the loaded library. The call includes an indication of the identity of the 32-bit target library, such as the file system filename for the library.

Figure 2B:
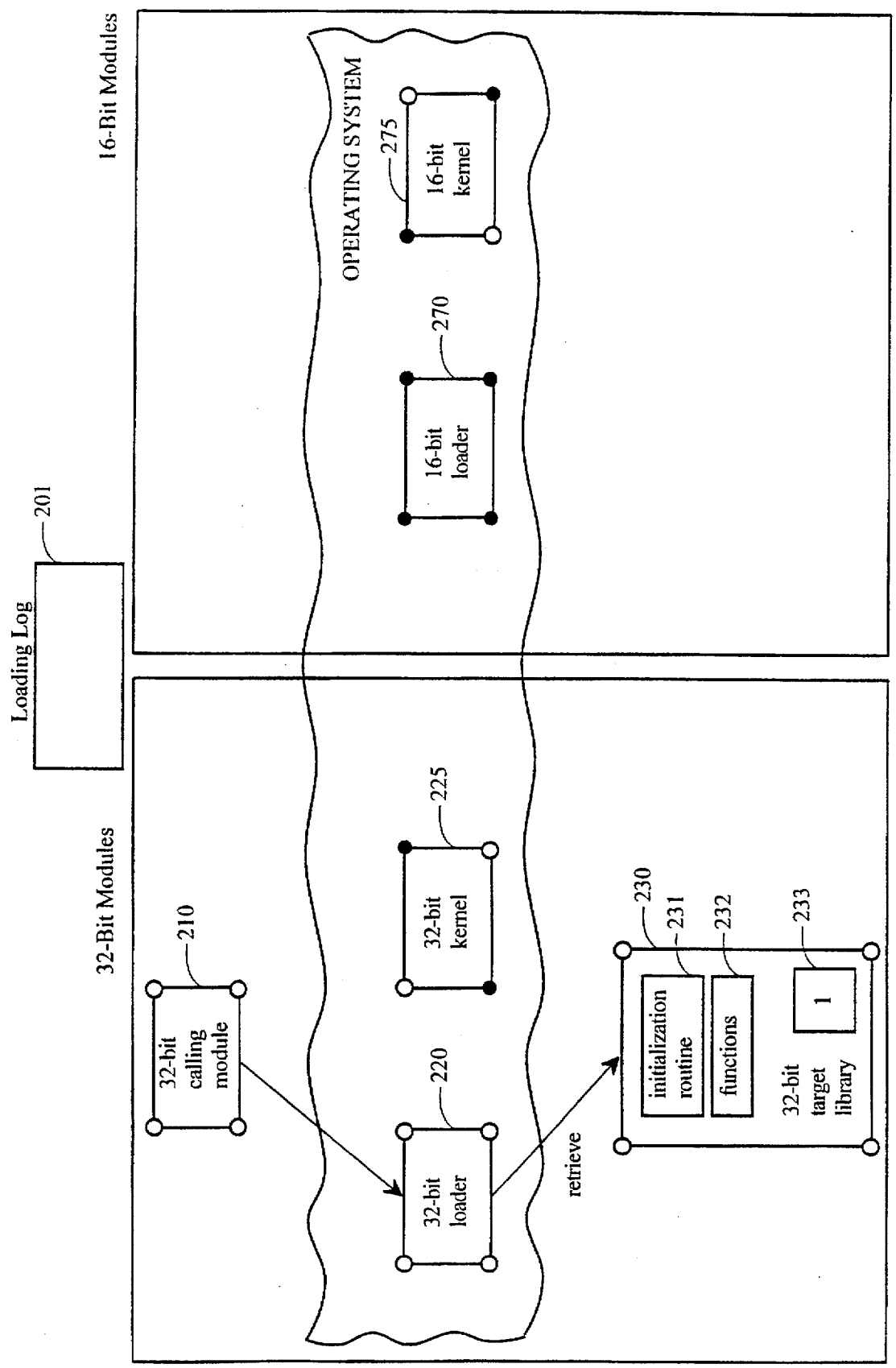

FIG. 2B is a memory diagram showing the loader's response to the call from the 32-bit calling module. The diagram shows that the 32-bit loader has retrieved the 32-bit target library 230 identified in the call by the 32-bit calling module from the storage device 131 and stored it in the memory 120. The library contains an initialization routine 231, one or more functions 232 each corresponding to a routine of the set, and a reference count 233. The loader sets the value of the reference count of the 32-bit target library to one, indicating that only one module (the 32-bit calling module) currently has a dependency on the library. If another module later calls the loader with a request to load the 32-bit target library, the loader will not retrieve the library and store it in the memory again, but will merely increment the reference count 233. When a module with a dependency on a library terminates, it calls the loader with requests to unload any same-size libraries upon which it is dependent. In response to each such call, the loader decrements the reference count of the indicated library. If decrementing a library's reference count leaves it with the value of zero, meaning that all of the modules dependent on the library have terminated, the loader removes the library from memory.

While the discussion herein assumes that loaders are called by calling modules that access the physical memory 120 directly, in some cases, loaders may be called by calling modules that access the physical memory indirectly via their own private virtual address spaces. In such cases, the loaders respond to loading and unloading requests somewhat differently: the loaders maintain separate reference counts for a library for each process that has loaded each library, and may map the library to or unmap the library from the calling module's address space of calling module's process. That is, when a calling module calls a loader to load a library, the loader increments the reference count for the library that is specific to the calling module's process. If this reference count is incremented from zero to one, the loader maps the library into the calling module's address space, retrieving it and storing it in physical memory if it is not already stored there. Similarly, when a calling module calls such a loader to unload a library, the loader calls the library's termination routine. The loader then decrements the reference count for the library that is specific to the calling module's process. If this reference count is decremented from one to zero, the loader unmaps the library from the calling module's address space, and, if all of the reference counts for the library for other processes are zero, frees the physical memory containing the library.

Figure 2C:
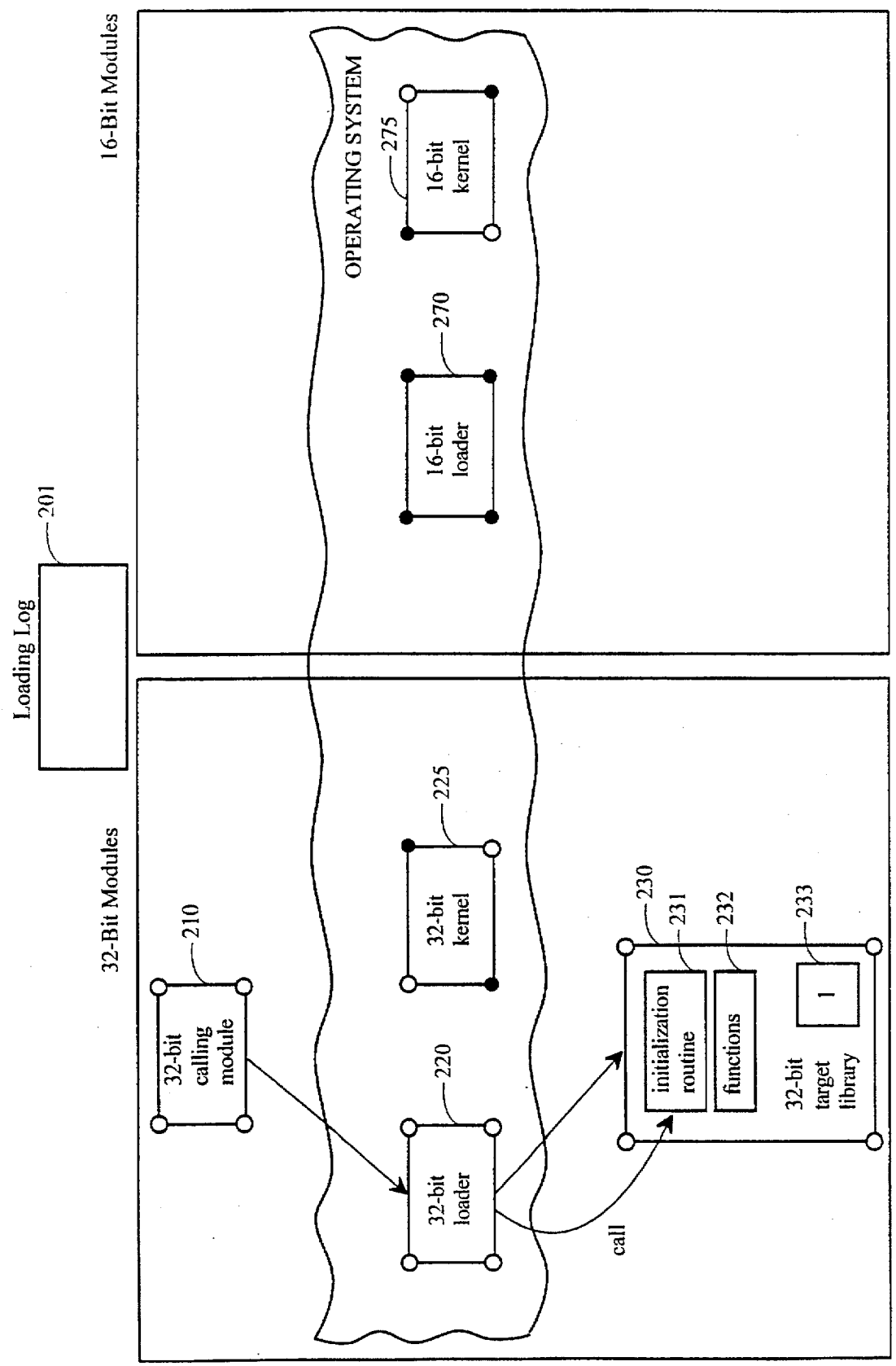

FIG. 2C is a memory diagram showing the 32-bit loader calling the initialization routine of the 32-bit target library.

Figure 3:
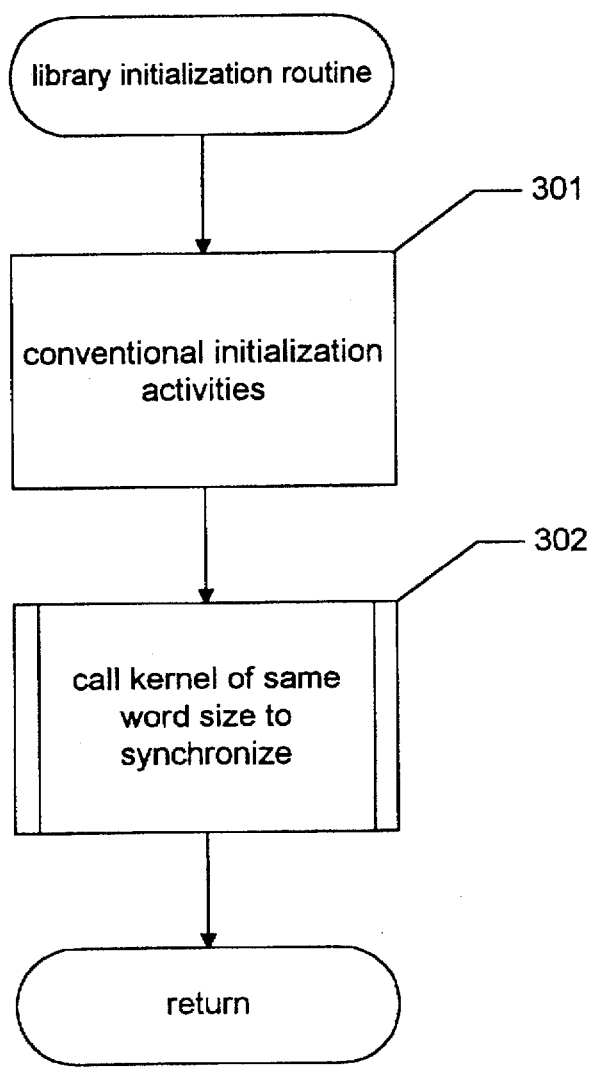
FIG. 3 is a flow diagram showing the generic structure of the initialization routine of the 32-bit target library, which is the structure of every library that is a member of pair.

FIG. 3 is a flow diagram showing the generic structure of the initialization routine of the 32-bit target library, which is the structure of every library that is a member of pair. In step 301, the initialization routine performs conventional library initialization activities, such as allocating memory used by functions in the library, and loading resources, such as a help file associated with the library. In step 302, the initialization routine calls the appropriate kernel to perform synchronization. In the case of the initialization routine of the 32-bit target library, the 32-bit kernel is called. The initialization routine then returns to the loader, which returns to the calling module.

Figure 2D:
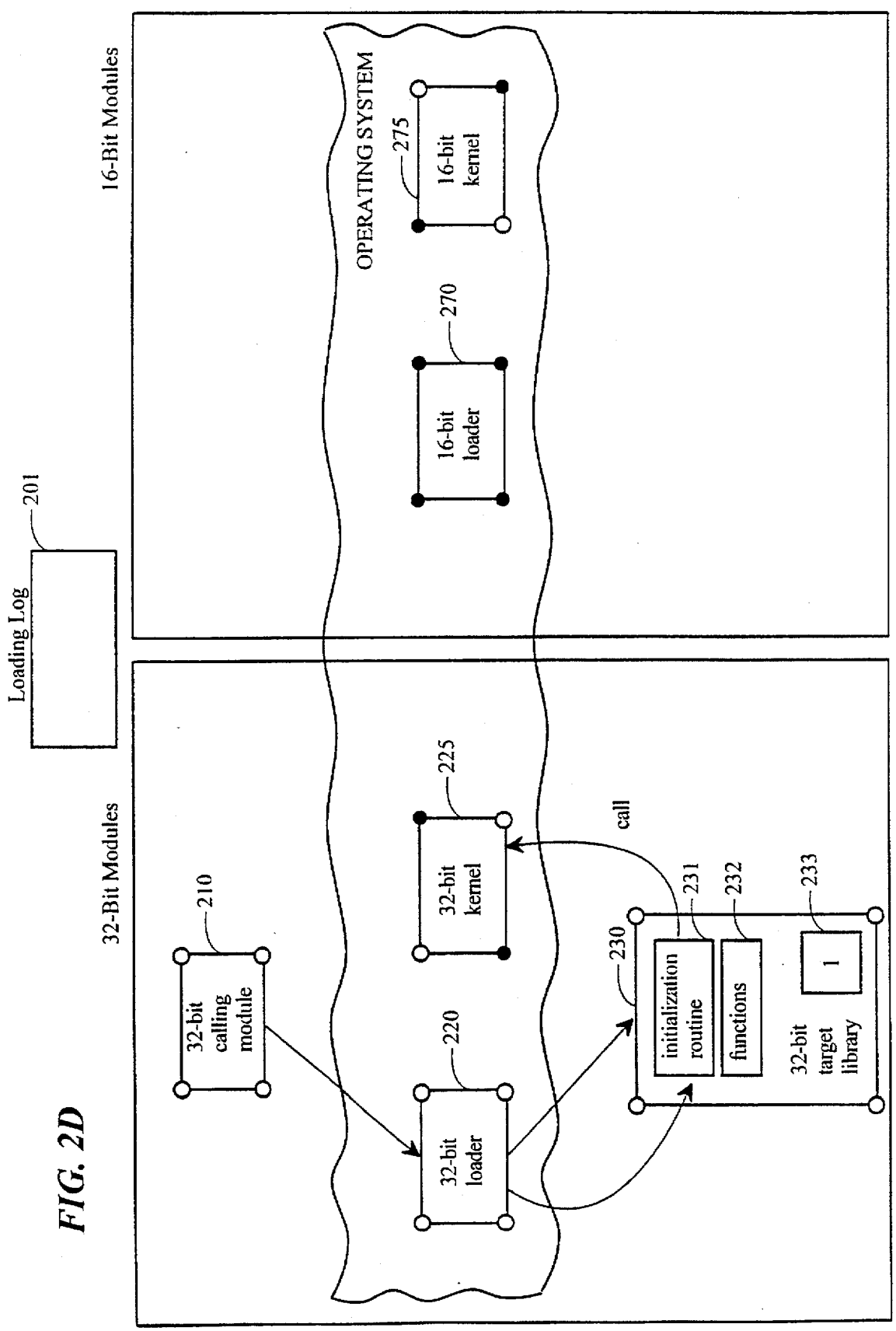
Figure 4:
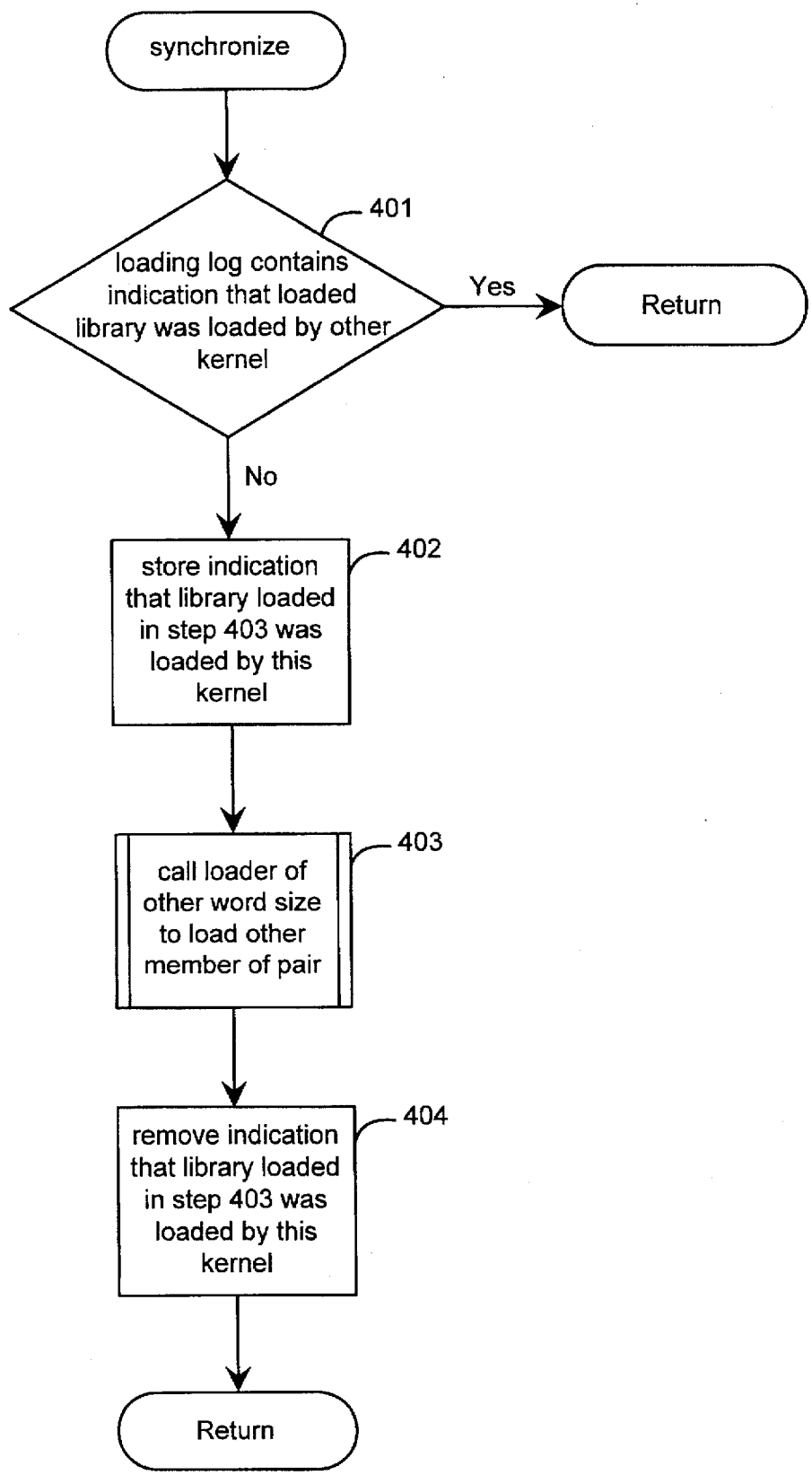
FIG. 4 is a flow diagram of the generalized synchronization function of both kernels.

FIG. 2D is a memory diagram showing the initialization routine of the 32-bit target library calling the 32-bit kernel in response to being called by the 32-bit loader. FIG. 4 is a flow diagram of the generalized synchronization function of both kernels ("synchronize function"). In step 401, if the loading log 201 contains an indication that the loaded library whose initialization function called the synchronize function was loaded by the kernel of the other word size, then the other library of the pair is already loaded and the synchronize function needs not reload it, so the synchronize function returns to the initialization routine that called it, else the synchronize function continues at step 402. In step 402, the synchronize function stores an indication in the loading log that the library about to be loaded in step 403 was loaded by this kernel. In step 403, the synchronize function calls the loader of the other word size to load the other member of the pair. In the case of the 32-bit kernel, this involves calling the 16-bit loader to load the 16-bit target library. In step 404, the synchronize function removes from the loading log the indication that the library loaded in step 403 was loaded by this kernel. The synchronize function then returns.

Figure 2E:
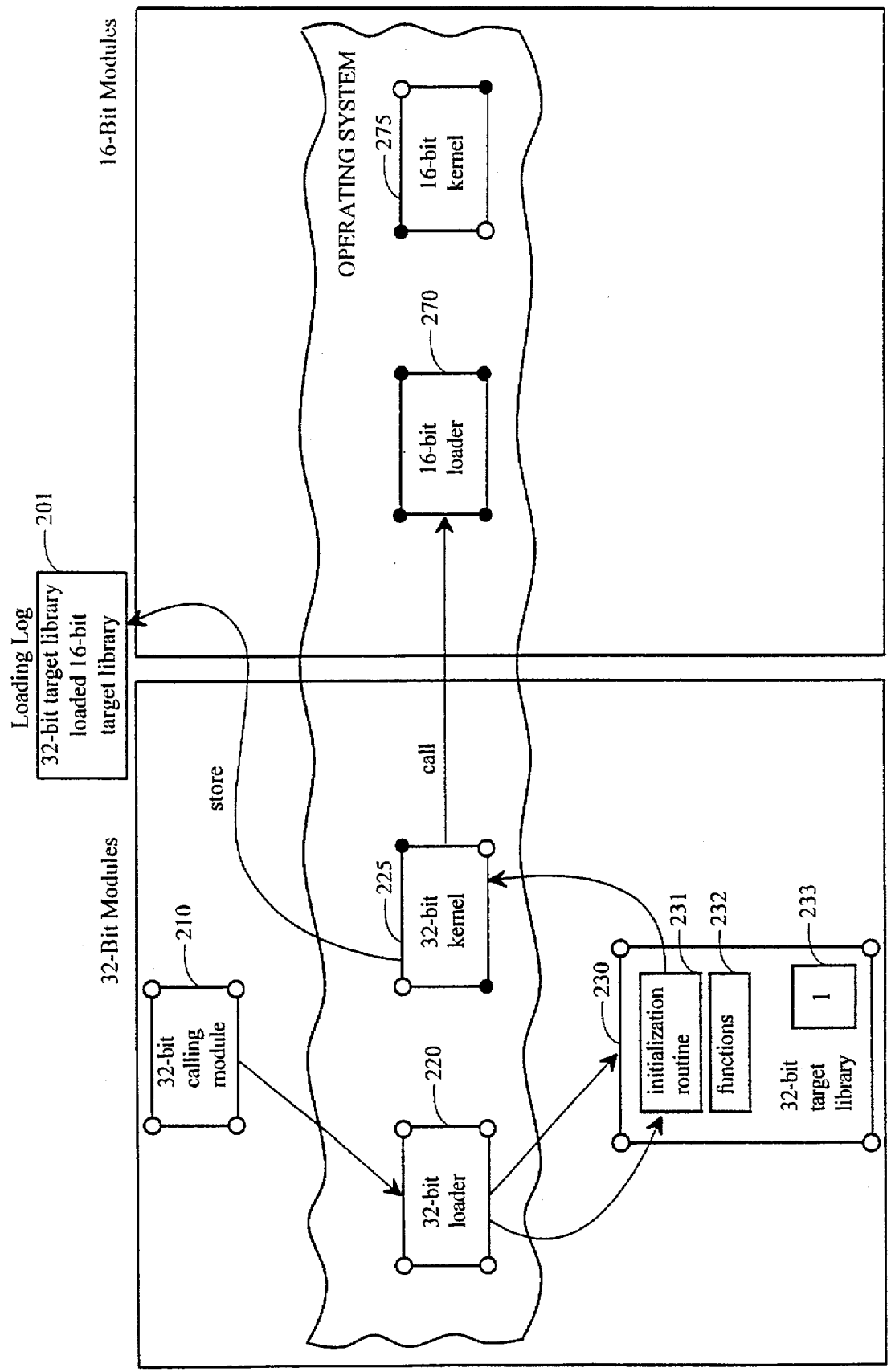

FIG. 2E is a memory diagram showing the effects of calling the synchronize function. Because there is no indication in the loading log of the example that the 32-bit target library was loaded by the 16-bit kernel, the synchronize function calls the 16-bit loader to load the 16-bit target library and stores an indication in the loading log that the 16-bit target library was loaded by the 32-bit kernel.

Figure 2F:
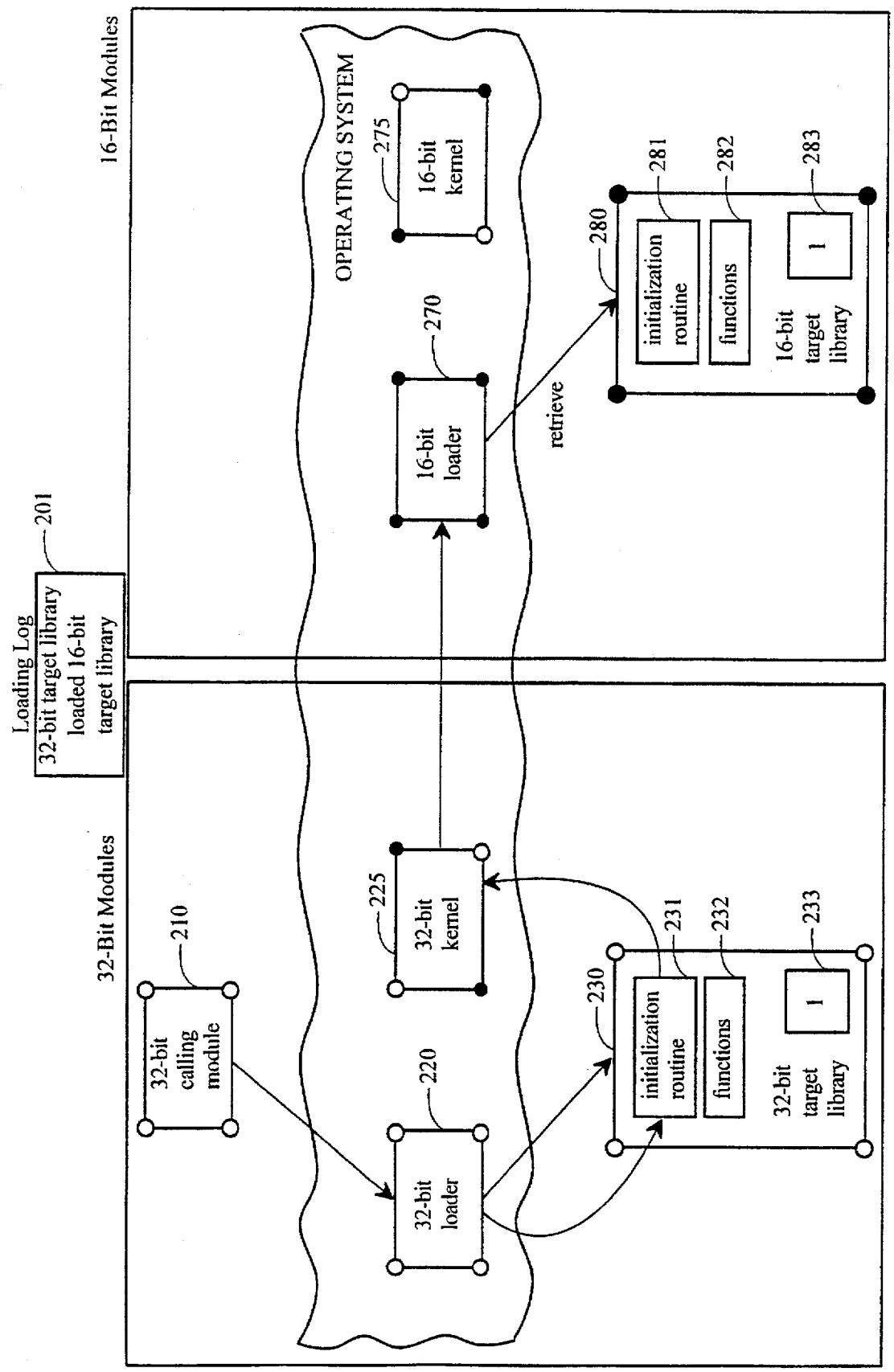

FIG. 2F is a memory diagram showing the effects of calling the 16-bit loader to load the 16-bit target library. The diagram shows that the 16-bit loader has retrieved the 16-bit target library 280 identified in the call by the 32-bit kernel from the storage device 131 and stored it in the memory 120. The library contains an initialization routine 281, one or more functions 282 each corresponding to a routine of the set, and a reference count 283. The loader sets the value of the reference count to one, indicating that only one module (the 32-bit kernel) has a dependency on the library.

Figure 2G:
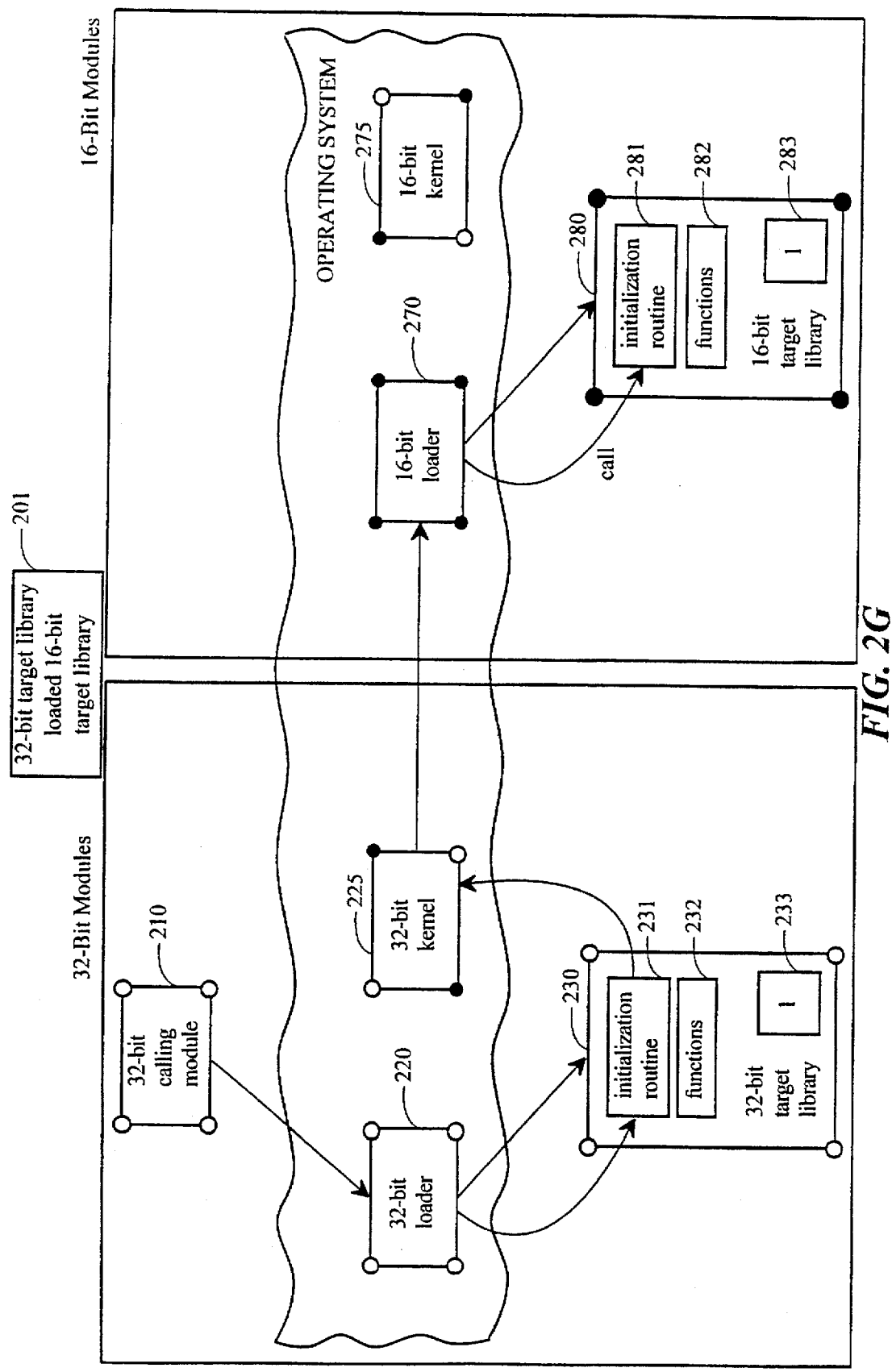
Figure 2H:
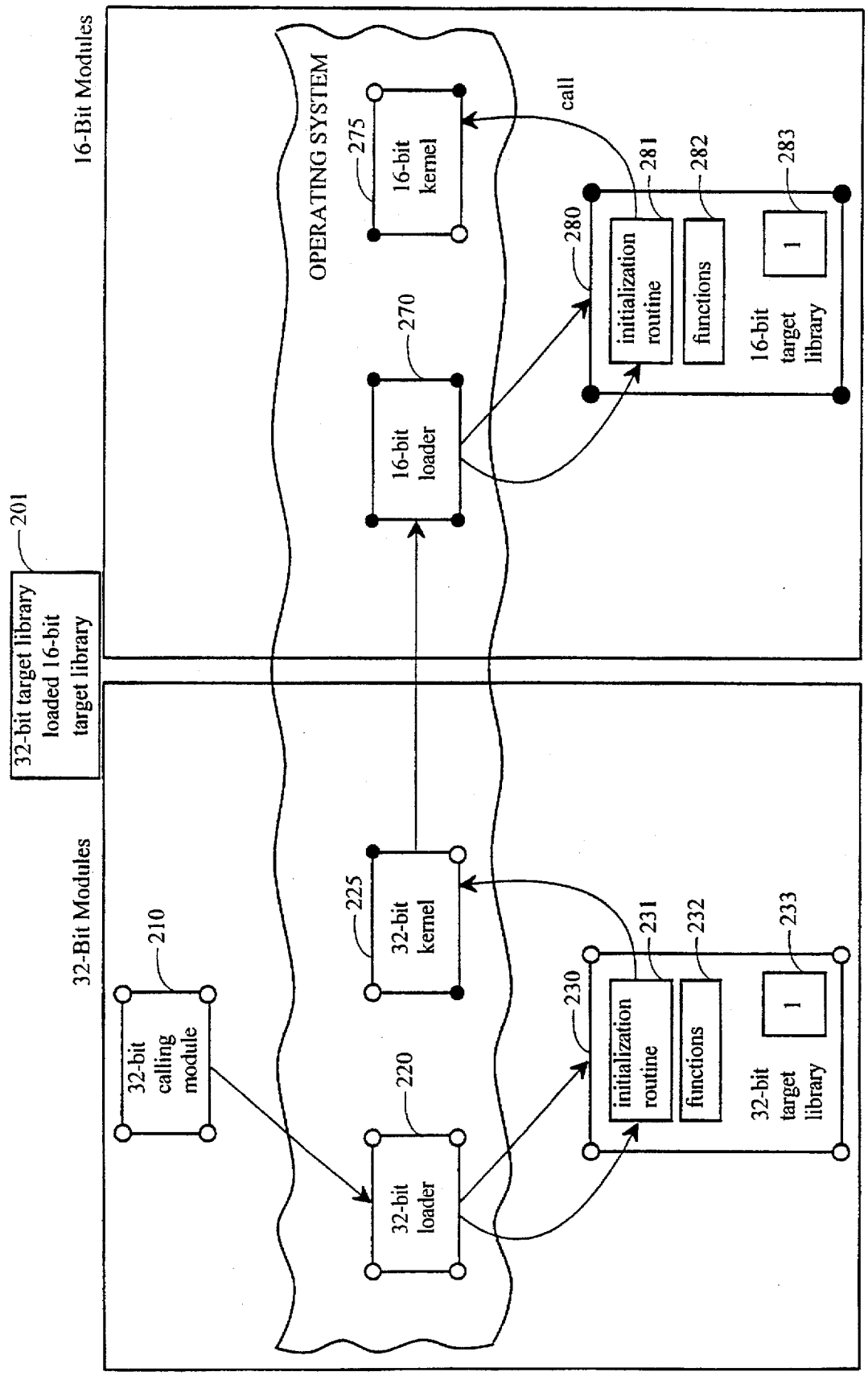

FIG. 2G is a memory diagram showing the 16-bit loader calling the initialization routine of the 16-bit target library. When the initialization routine of the 16-bit target library is called, it performs the steps shown in FIG. 3. That is, the initialization routine performs conventional initialization activities and calls the 16-bit kernel to synchronize the library pair. FIG. 2H is a memory diagram showing the initialization routine of the 16-bit target library calling the 16-bit kernel to synchronize the library pair. When the initialization routine of the 16-bit target library calling the 16-bit kernel to synchronize the library pair, the synchronize function shown in FIG. 4 checks to see whether the loading log 201 contains an indication that the 16-bit target library was loaded by the 32-bit target library. Because the loading log does contain such an indication, the synchronize function returns to the initialization routine of the 16-bit target library without reloading the 32-bit target library. The initialization routine then returns to the 16-bit loader, which returns to the 32-bit kernel. The 32-bit kernel removes the indication that it stored in the loading log as shown in FIG. 2I, then returns to the initialization routine of the 32-bit library, which returns to the 32-bit loader, which returns to the 32-bit calling module.

2. Unloading

Synchronization also includes unloading the different-size library when the same-size library is unloaded by the calling module. This involves inserting a step in a termination routine of each library, which is called when the library is unloaded, that calls the kernel to allow it to unload the other library of the pair.

Figure 5:
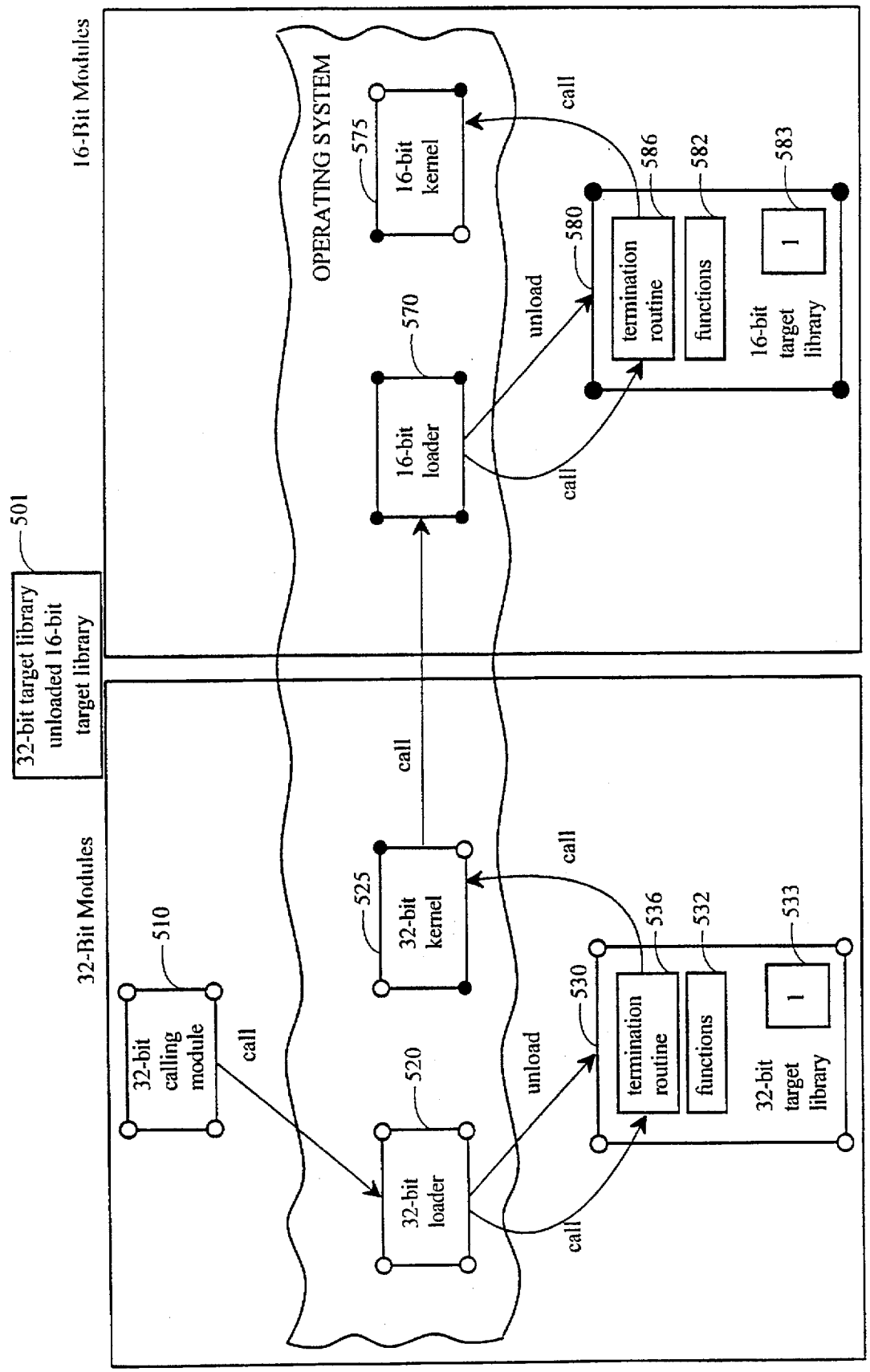
FIG. 5 is a memory diagram showing a calling module unloading the same-size library, which causes the different-size library to also be unloaded.

FIG. 5 is a memory diagram showing a calling module unloading the same-size library, which causes the different-size library to also be unloaded. FIG. 5 shows the 32-bit calling module 510 calling the 32-bit loader 520 to request the unloading of the 32-bit target library 530. Before unloading the 32-bit target library, the 32-bit loader calls a termination routine 536 of the 32-bit target library, which parallels the initialization routine shown in FIG. 3.

Figure 6:
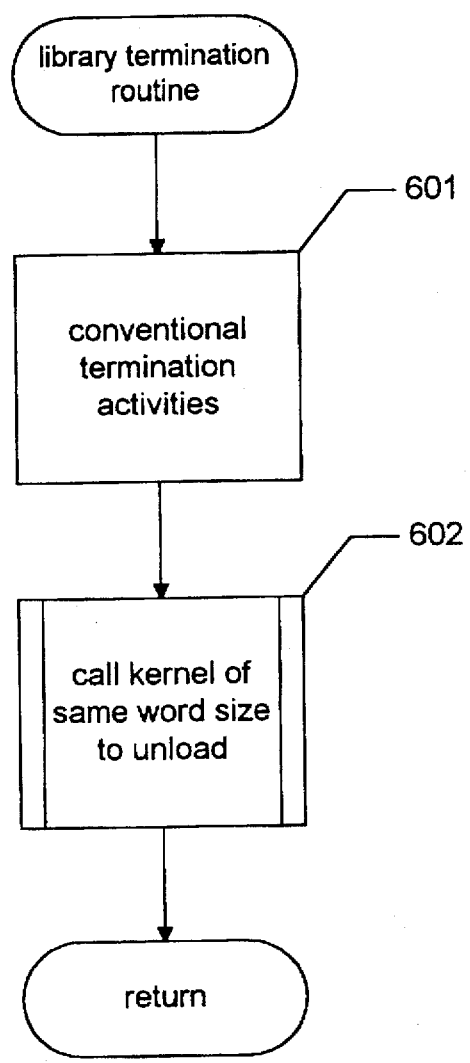
FIG. 6 is a flow diagram of the termination routine.

FIG. 6 is a flow diagram of the termination routine. In step 601, the termination routine performs conventional termination activities, such as deallocating memory allocated by the initialization routine. In step 602, the termination routine calls an unloading function of the 32-bit kernel 525 to allow it to unload the other library of the pair. The termination routine then returns. Each kernel has an unloading function, which parallels the synchronization routine shown in FIG. 4.

Figure 7:
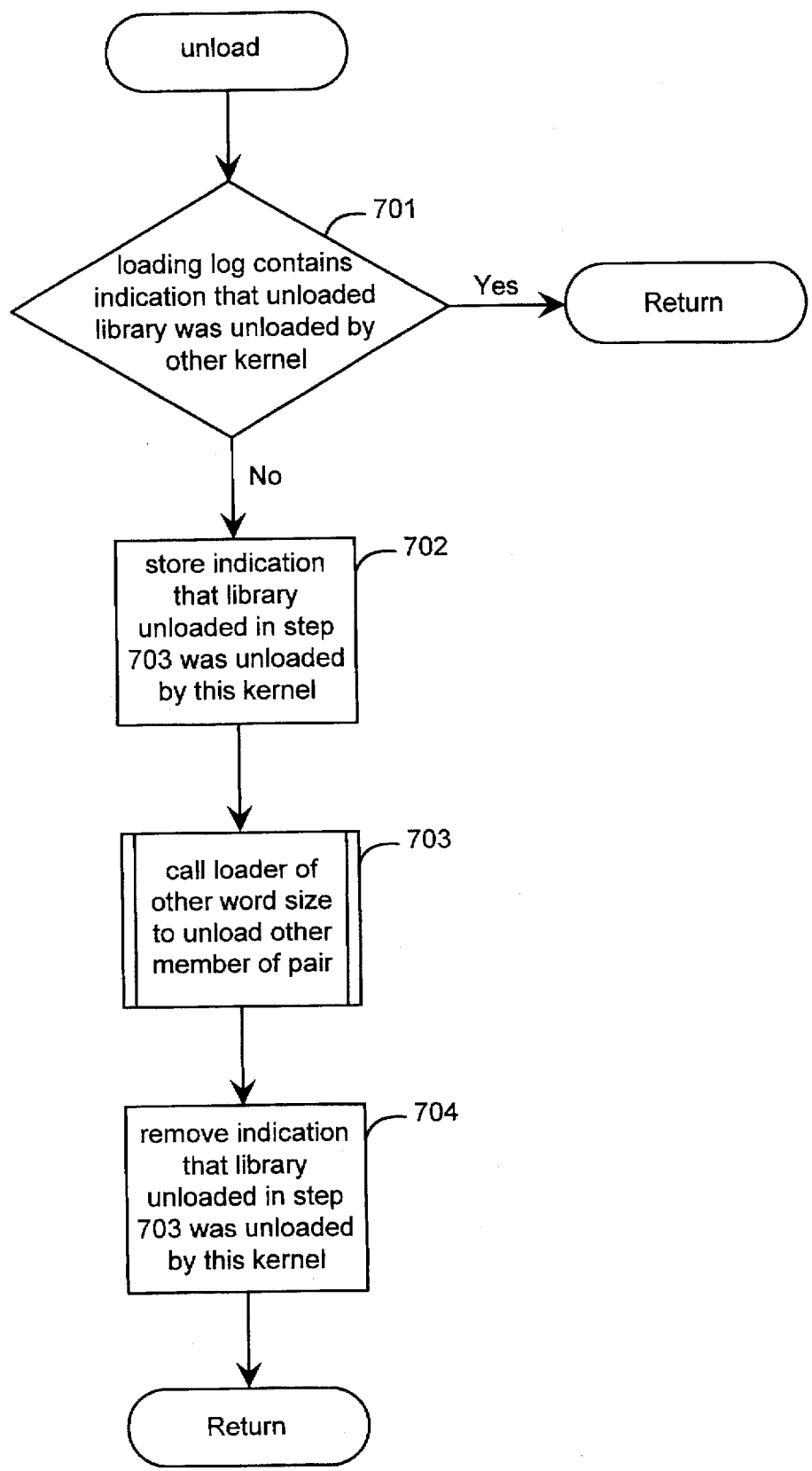
FIG. 7 is a flow diagram of the unloading function.

FIG. 7 is a flow diagram of the unloading function. In step 701, if the loading log contains an indication that the other kernel unloaded the library of the pair of the other word size, then the unloading function returns, else the unloading function continues at step 702. In step 702, the unloading function stores an indication in the loading log the library about to be unloaded in step 703 was unloaded by this kernel. In step 703, the unloading function calls the loader of the other word size to unload the library of the pair of the other word size. In step 704, the unloading function removes the indication from the loading log. The unloading function then returns.

In the example, the 32-bit kernel determines that the loading log 501 does not contains an indication that the 16-bit kernel caused the 16-bit target library 580 to be unloaded, and therefore stores an indication that the 32-bit target library was unloaded by this kernel and calls the 16-bit loader 570 to unload the 16-bit target library. When the 16-bit loader is called to unload the 16-bit target library, it calls the termination routine 586 of the 16-bit target library. The termination routine of the 16-bit target library performs conventional termination activities and calls the 16-bit kernel 575 to allow it to unload the other library of the pair. The 16-bit kernel determines that the loading log contains an indication that the library that is being unloaded is being unloaded by the kernel of the other word size, so the 16-bit kernel returns to the termination routine of the 16-bit target library, which returns to the 16-bit loader. The 16-bit loader then decrements the reference count 583 of the 16-bit target library. Because the new value of the reference count is zero, the 16-bit loader unloads the 16-bit target library from memory. The 16-bit loader then returns to the 32-bit kernel, which clears the loading log of the indication that the 32-bit kernel unloaded the 16-bit target library and returns to the termination routine of the 32-bit target library, which returns to the 32-bit loader. The 32-bit loader then decrements the reference count 533 of the 32-bit target library. Because the new value of the reference count is zero, the 32-bit loader unloads the 32-bit target library from memory. The 32-bit loader then returns to the 32-bit calling module, which can itself terminate.

B. Synchronization Where an Initialization Routine is Called Only Once

Many conventional loaders, herein referred to as "each load notification loaders," invoke a library's initialization routine each time they load the library, and a library's termination routine each time they unload the library. That is, every time an each load notification loader increments a library's reference count, it invokes the library's initialization routine, and every time an each load notification loader decrements a library's reference count, it invokes the library's termination routine. However, some conventional loaders, referred to herein as "initial load notification loaders," only invoke a library's initialization routine the first time they load the library, and its termination routine the last time the unload the library. That is, initial load notification loaders invoke the initialization routine only when the library's reference count is incremented from zero to one, and invoke the termination routine only when the library's reference count is decremented from one to zero.

For example, in a particular operating system, the 16-bit loader may invoke a 16-bit library's initialization routine each time it loads the library and its termination routine each time it unloads the library, and the 32-bit loader may only invoke a 32-bit library's initialization routine when the library's reference count is incremented from zero to one and its termination routine when the library's reference count is decremented from one to zero. In this example, because the 32-bit loader only invokes a 32-bit library's initialization routine when the library's reference count is incremented from zero to one, the 32-bit library's initialization routine is only able to call the 32-bit kernel to synchronize the pair when the library's reference count is incremented from zero to one. Further, because the 32-bit loader only invokes a 32-bit library's termination routine when the library's reference count is decremented from one to zero, the 32-bit library's termination routine is only able to call the 32-bit kernel to unload when the library's reference count is decremented from one to zero.

The kernel synchronization and unloading functions discussed above have dependencies on being called each time a library is loaded and unloaded, respectively, which disrupt synchronization in some instances under an operating system in which one of the loaders is an initial load notification loader. Synchronization disruption occurs when (1) a calling module of the word size of the each load notification loader loads the library of a pair of the word size of the each load notification loader, then (2) a calling module of the word size of the initial load notification loader loads the library of the word size of the initial load notification loader of the same pair, then (3) the calling module of the word size of the each load notification loader unloads the library of the word size of the each load notification loader. First, a calling module of the word size of the each load notification loader loads the library of a pair of the word size of the each load notification loader. The initialization routine of the library of the word size of the each load notification loader calls the kernel of the word size of the each load notification loader to synchronize, which places an indication in the loading log and calls the loader of the word size of the initial load notification loader, i.e., the initial load notification loader, to load the library of the word size of the initial load notification loader. Because the library's reference count is incremented from zero to one, the initial load notification loader calls the initialization routine of the library of the word size of the initial load notification loader. The initialization routine calls the kernel of the word size of the initial load notification loader to synchronize, which does not call the loader of the word size of the each load notification loader, since the loading log contains an indication that the library of the word size of the initial load notification loader was loaded by the kernel of the word size of the each load notification loader. Because each library was loaded once, each has a reference count of one. Second, a calling module of the word size of the initial load notification loader loads the library of the pair of the word size of the initial load notification loader. Because this increments the reference count of the library of the word size of the initial load notification loader from one to two, the initial load notification routine does not call the library's initialization routine, which would otherwise call the kernel of the word size of the initial load notification loader to load the library of the word size of the each load notification loader. At this point, the library of the word size of the initial load notification loader has a reference count of two, the library of the word size of the each load notification loader a reference count of one. Third, the calling module of the word size of the each load notification loader calls the each load notification loader to unload the library of the word size of the each load notification loader. The each load notification loader calls the termination routine of the library of the word size of the each load notification loader, which calls the kernel of the word size of the each load notification loader to unload. The kernel of the word size of the each load notification loader calls the initial load notification loader to unload the library of the word size of the initial load notification loader, which decrements its reference count from two to one. The each load notification library then decrements the reference count of the library of the word size of the each load notification loader from one to zero and removes it from memory. At this point, the word size of the initial load notification loader library has a reference count of one, and the library of the word size of the each load notification loader is no longer in memory. Because the calling module of the word size of the initial load notification loader could now call a thunking function of the library of the word size of the initial load notification loader, which would unsuccessfully attempt to call the corresponding actual function in the library of the word size of the each load notification loader, the synchronization of the library pair is disrupted.

In order to overcome the dependencies described above for operating systems in which one of the loaders is an initial load notification loader, the kernel synchronization and unloading functions are modified according to a preferred embodiment into two different modified synchronization functions, one for the kernel of each word size ("synchronize each" and "synchronize initial"), as well as two different modified unloading functions ("unload each" and "unload initial"), in order to operate properly under such an operating system. As is discussed in greater detail below in conjunction with FIGS. 8–11, the synchronization function of the kernel of the word size of the initial load notification loader is preferably modified to load the other library of the pair every time it is called, without checking the loading log for an indication that the loaded library was loaded by the other kernel. This ensures that the kernel always loads the library of the other word size at its only opportunity to do so, i.e., the only time it is called by the initialization routine. Similarly, the unloading function of the kernel of the word size of the initial load notification loader is preferably modified to unload the other library of the pair every time it is called, to ensure that the kernel always unloads the other library at its only opportunity to do so. Because the other library is always loaded once the first time the library of the word size of the initial load notification loader is loaded, incrementing the reference count of the other library, the other library cannot be removed from memory until it is unloaded by the modified unloading routine when the library of the word size of the initial load notification loader is being removed from memory. Because the library of the word size of the initial load notification loader cannot be removed from memory until its calling module unloads it, the other library cannot be removed from memory at any time when the calling module can call a thunking function in the library of the word size of the initial load notification loader and thereby cause an actual function of the other library to be called. This solves the disruption problem demonstrated above. The modified synchronization and unloading functions of the kernel of the word size of the initial load notification loader preferably place indications of loading and unloading in the loading log, which the modified functions of the kernel of the word size of the each load notification loader use to determine whether they need to load or unload the library of the word size of the initial load notification loader. Because the modified functions of the kernel of the word size of the initial load notification loader do not check the loading log, however, the modified functions of the kernel of the word size of the each load notification loader do not place their own indications in the loading log.

Figure 8:
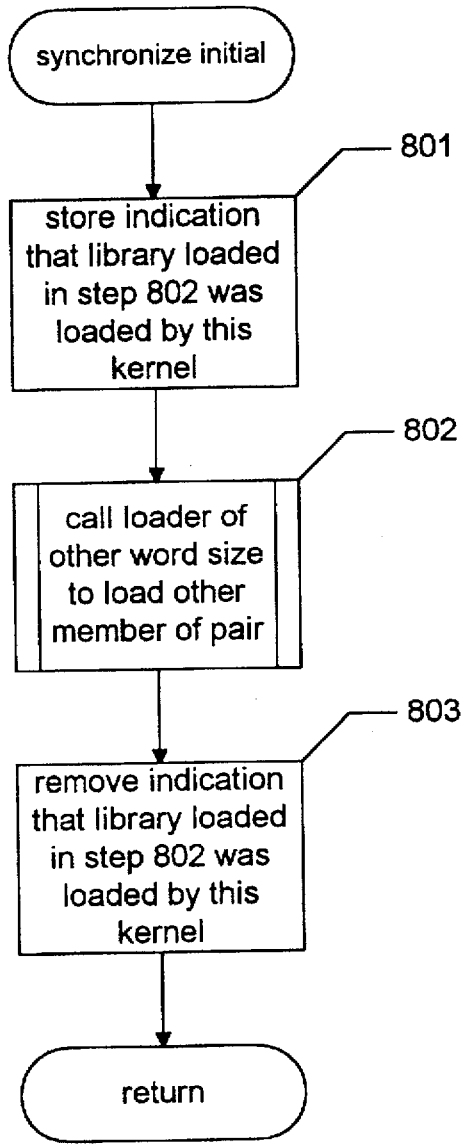
FIG. 8 is a flow diagram of the synchronize initial function for synchronizing a library pair in a kernel of the word size of an initial load notification loader.

FIG. 8 is a flow diagram of the synchronize initial function for synchronizing a library pair in a kernel of the word size of an initial load notification loader. In step 801, the synchronize initial function stores an indication in the loading log 201 that the library about to be loaded in step 802 was loaded by this kernel. In step 802, the synchronize initial function calls the loader of the other word size to load the other member of the pair. In step 803, the synchronize initial function removes from the loading log the indication that the library loaded in step 802 was loaded by this kernel. The synchronize function then returns.

Figure 9:
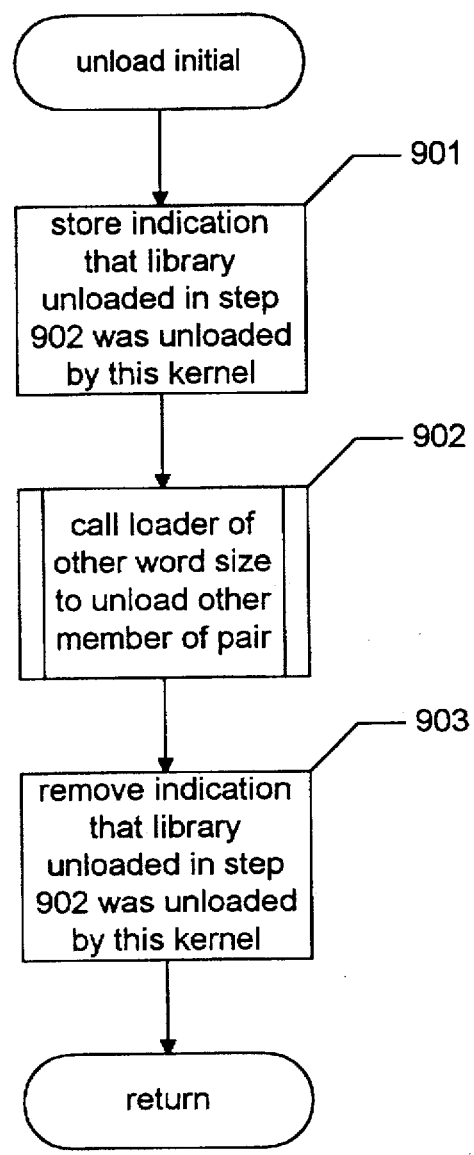
FIG. 9 is a flow diagram of the unload initial function for unloading a library pair in a kernel of the word size of an initial load notification loader.

FIG. 9 is a flow diagram of the unload initial function for unloading a library pair in a kernel of the word size of an initial load notification loader. In step 901, the unload initial function stores an indication in the loading log the library about to be unloaded in step 902 was unloaded by this kernel. In step 902, the unload initial function calls the loader of the other word size to unload the library of the pair of the other word size. In step 903, the unload initial function removes the indication from the loading log. The unload initial function then returns.

Figure 10:
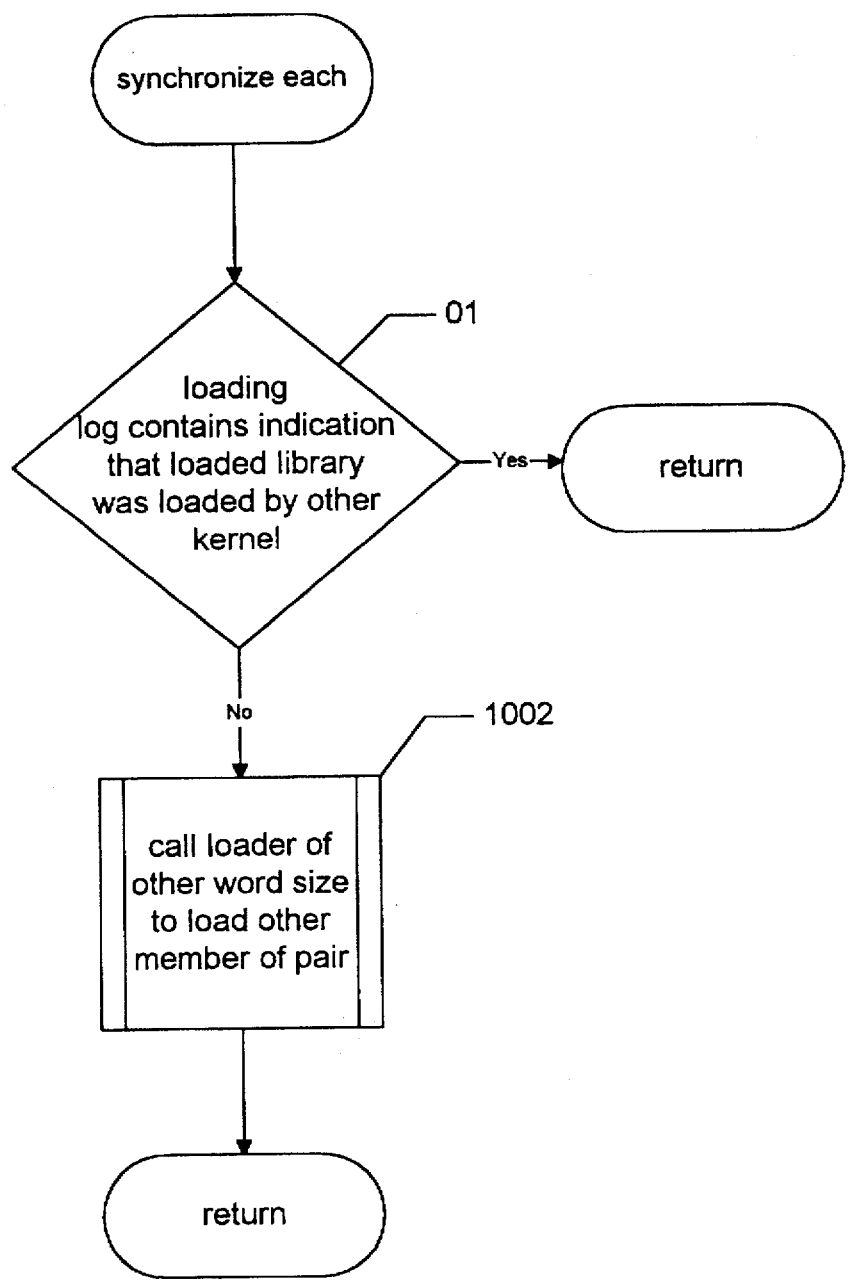
FIG. 10 a flow diagram of the synchronize each function for synchronizing a library pair in a kernel of the word size of an each load notification loader.

FIG. 10 a flow diagram of the synchronize each function for synchronizing a library pair in a kernel of the word size of an each load notification loader. In step 1001, if the loading log contains an indication that the loaded library whose initialization function called the synchronize each function was loaded by the kernel of the other word size, then the other library of the pair is already loaded and the synchronize each function needs not reload it, so the synchronize each function returns to the initialization routine that called it, else the synchronize each function continues at step 1002. In step 1002, the synchronize each function calls the loader of the other word size to load the other member of the pair. The synchronize each function then returns.

Figure 11:
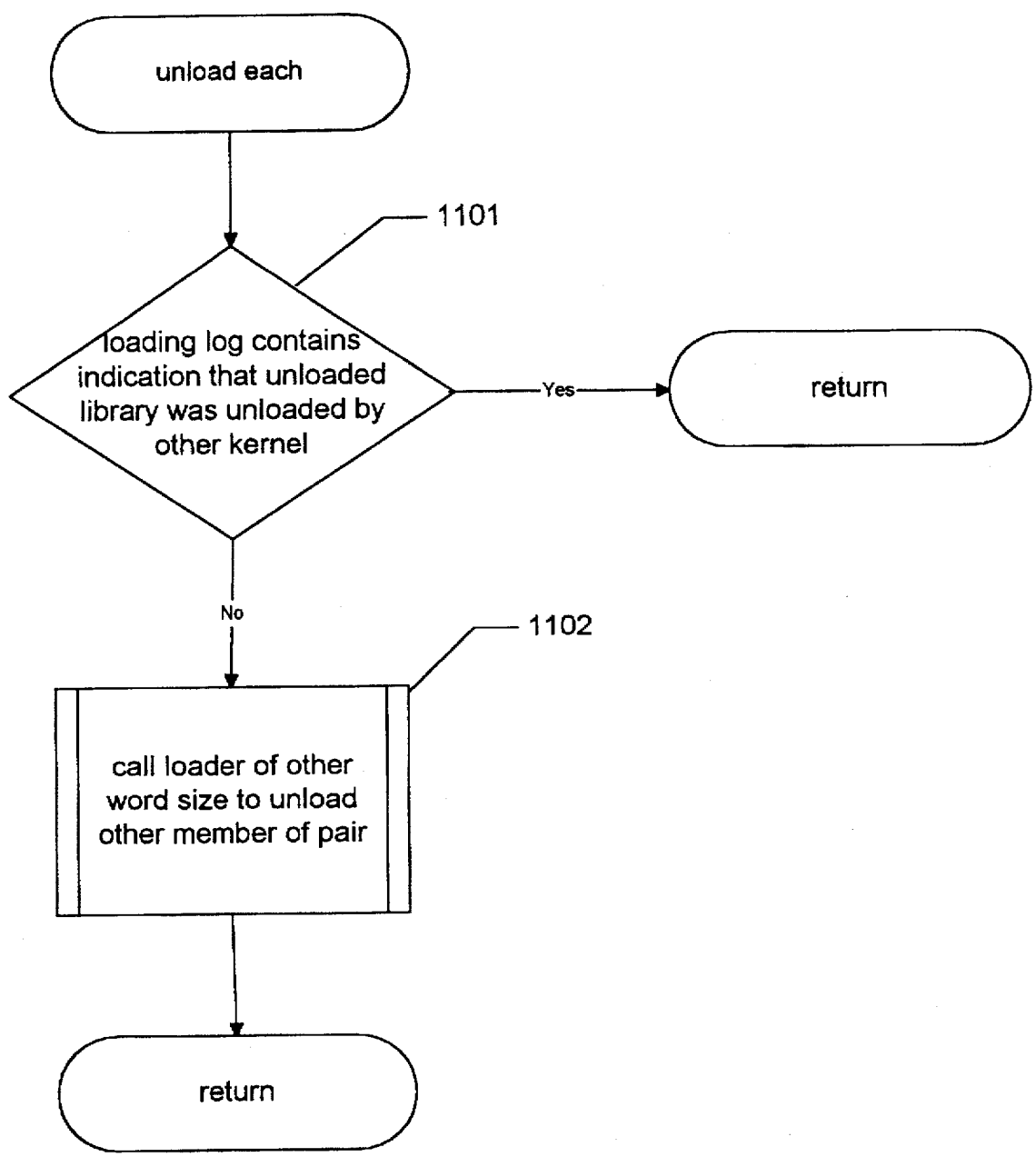
FIG. 11 is a flow diagram of the unload each function for unloading a library pair in a kernel of the word size of an each load notification loader.

FIG. 11 is a flow diagram of the unload each function for unloading a library pair in a kernel of the word size of an each load notification loader. In step 1101, if the loading log contains an indication that the other kernel unloaded the library of the pair of the other word size, then the unload each function returns, else the unload each function continues at step 1102. In step 1102, the unload each function calls the loader of the other word size to unload the library of the pair of the other word size. The unload each function then returns.

C. Synchronization on an As-Needed Basis

No benefit is derived from loading the different-size library where no thunks from the same-size library to the different-size library actually occur. For this reason, in a preferred embodiment, the kernels utilize "as-needed loading" to load the different-size library, so that the resources required to actually load the different-size library are not expended until and unless a thunk from the same-size library to the different-size library actually occurs.

In order to implement as-needed loading, each kernel is modified to increment a virtual reference count associated with the library of the other word size when it is called by the initialization routine of the library with the same word size, instead of calling the appropriate loader to load the library of the other word size. Because the loader has not yet been called, the library of the other word size has not yet been loaded. When the first thunking call occurs from the library of the same word size to the library of the other word size (which is directed to the kernel before the kernel rewrites the thunking call as described below), the kernel calls the loader once for each time the virtual reference count was incremented in order to increment the reference count in the other library. Thus, the library of the other word size, i.e., the different-size library, is loaded when the first thunking call to it occurs.

III. Rewriting Thunk Calls

Figure 12A:
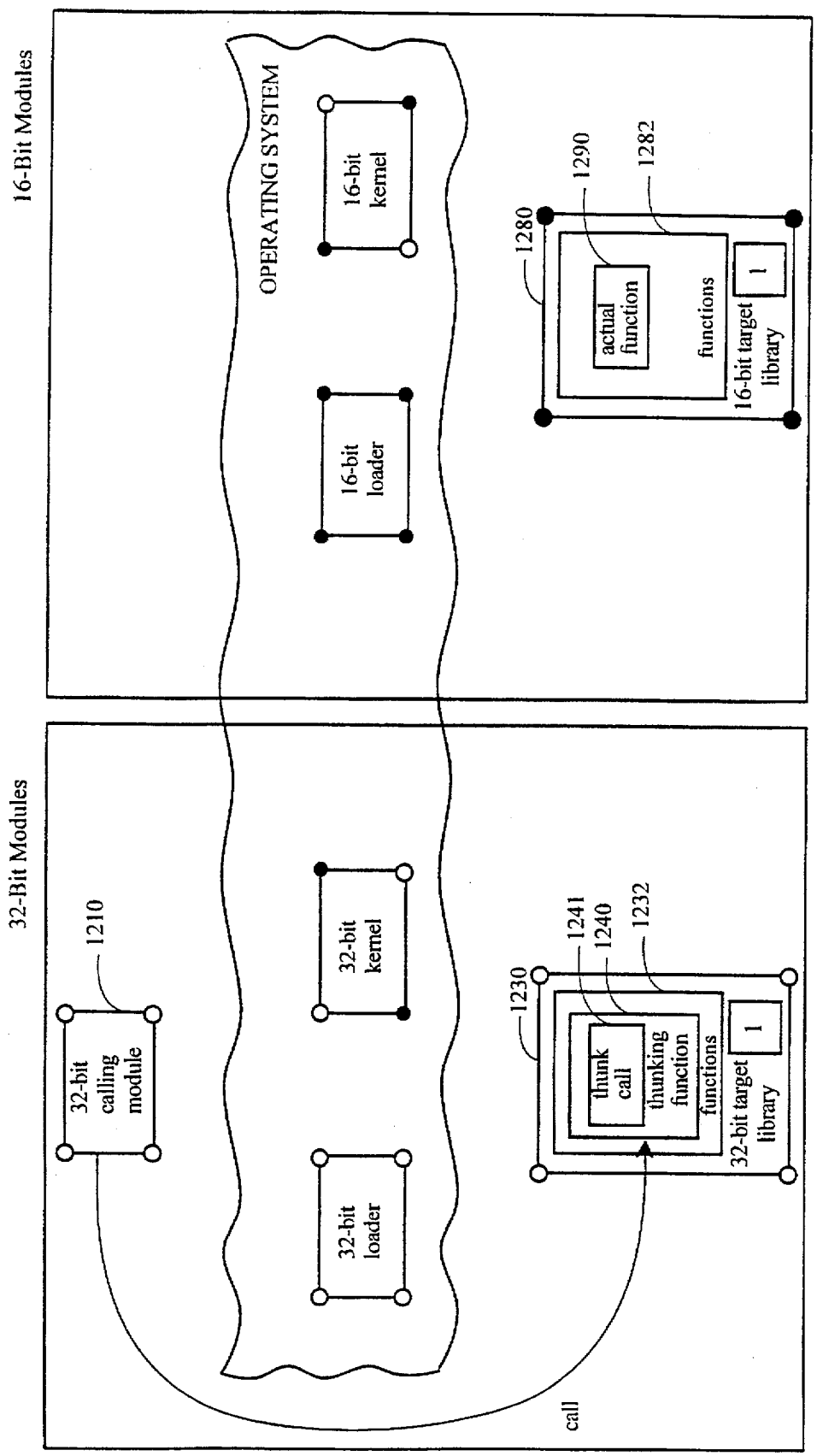
FIGS. 12A–12E are memory diagrams illustrating the operation of preferred embodiments of the invention when the calling module calls a thunking function in the same-size library.

After the libraries of a pair are synchronized as described above, the calling module may call functions in the same-size library in order to invoke routines of the set. FIG. 12A is a memory diagram showing the 32-bit calling module calling a particular function 1240 among the functions 1232 of the 32-bit target library 1230. If a called function of the same-size library is the actual function for the invoked routine, then the called function of the same-size library executes to provide the invoked function. If the called function of the same-size library is the thunking function for the invoked routine, then the called function of the same-size library executes a to provide the invoked function. FIGS. 12A–12E are memory diagrams illustrating the operation of preferred embodiments of the invention when the calling module calls a thunking function in the same-side library. FIG. 12A further shows that the function 1240 is a thunking function, and contains a thunk call 1241.

Figure 12B:
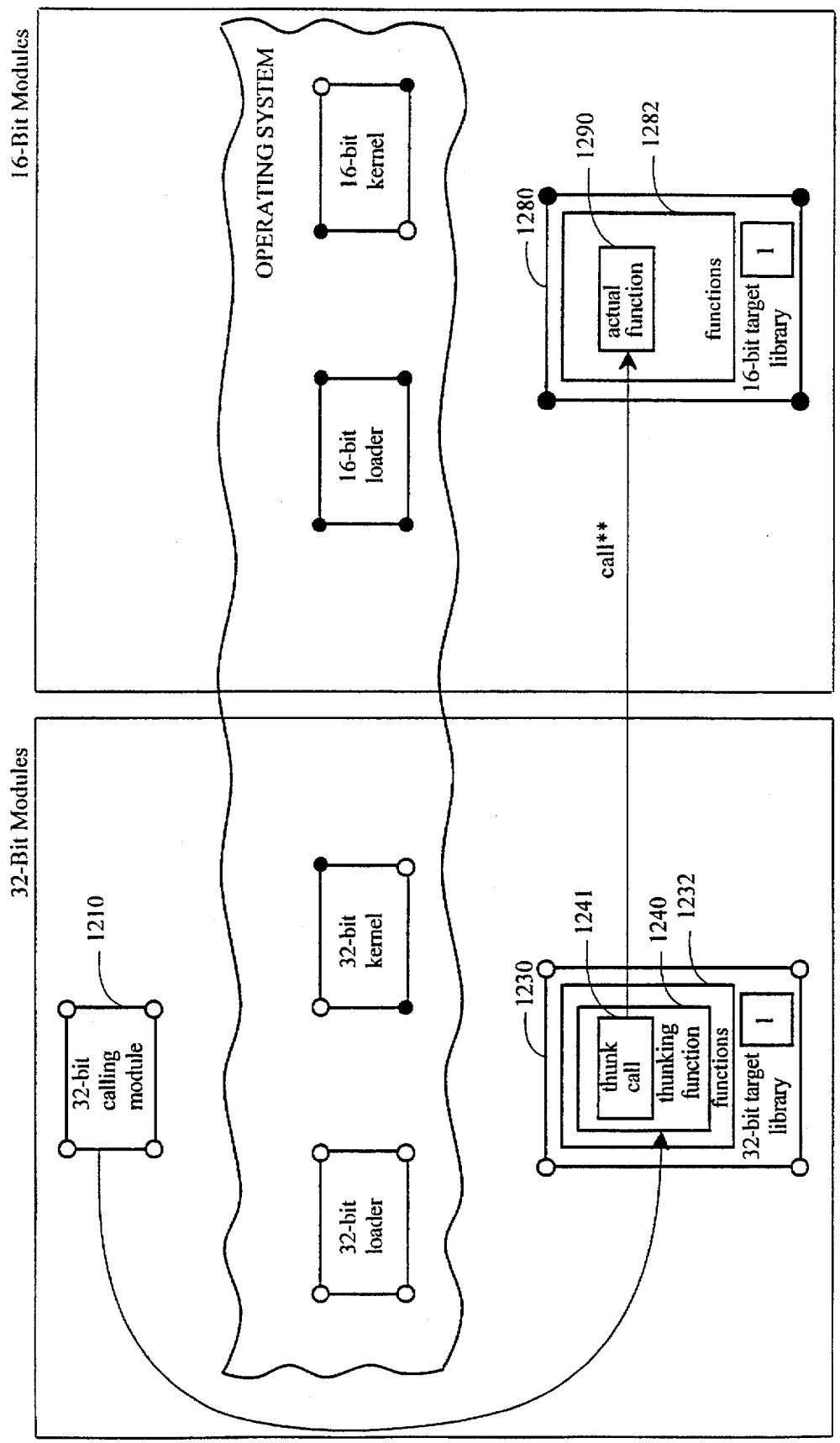

The objective of the thunk call is to call the actual function 1290 among the functions 1282 of the 16-bit target library 1280. If the library developer that develops a library pair has access to a special compiler that, like the compiler used by operating system developer to compile the kernel, is capable of compiling a module that may be called by modules of one word size (e.g., the 32-bit calling module) and may call modules of another word size (e.g., the 16-bit target library), then the library developer can compile the 32-bit target library containing a thunk call 1241 that calls directly to the actual function 1290, as shown in FIG. 12B. However, because such compilers are not commonly available, many library developers must compile the libraries of a pair as conventional 16- or 32-bit modules that are initially incapable of calling modules of the other word size. Accordingly, in a preferred embodiment of the invention, each kernel contains a thunk call rewriting function for storing a call to actual functions in libraries of the other word size in thunking functions in libraries of the same word size.

Figure 12C:
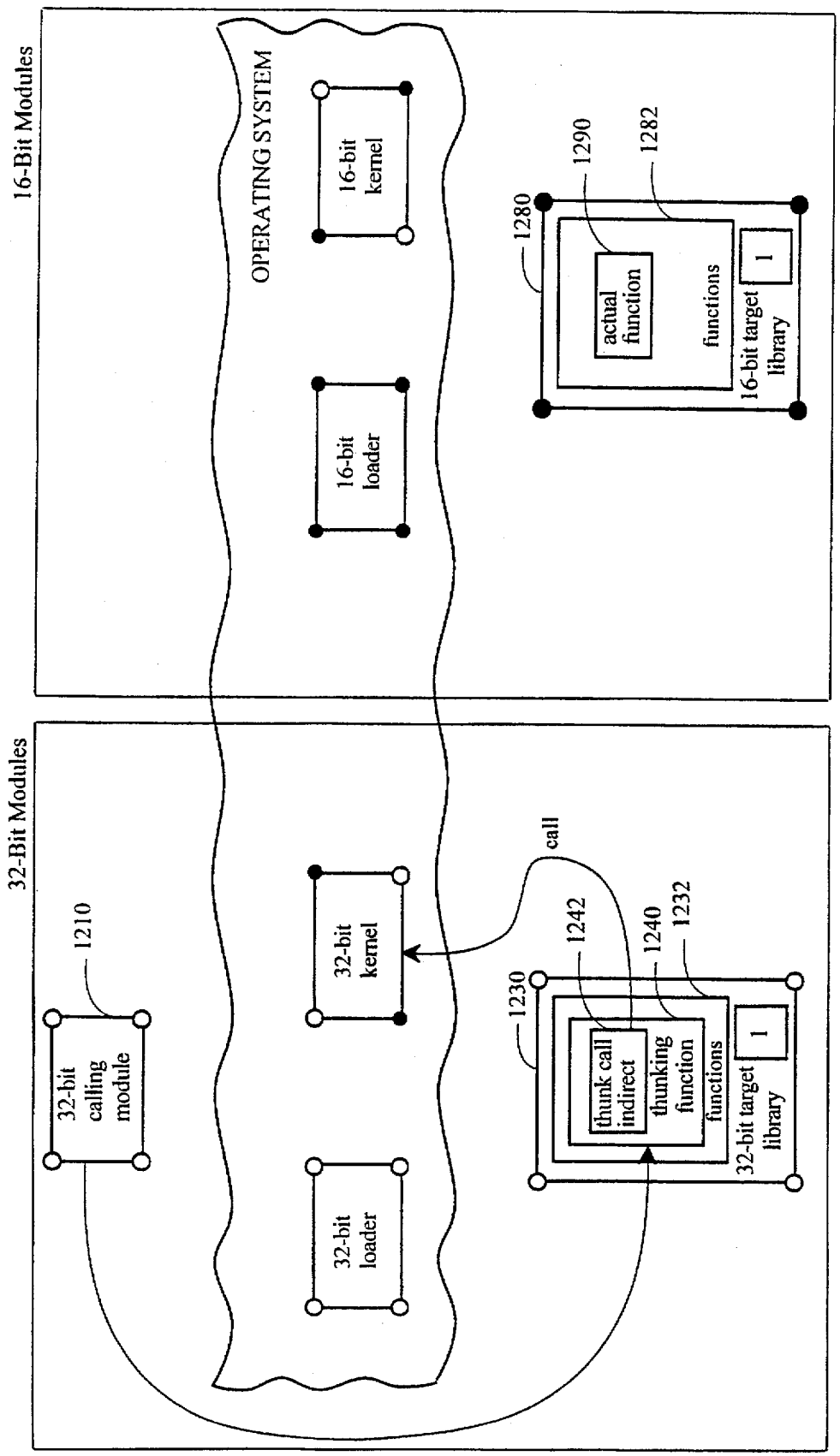
Figure 12D:
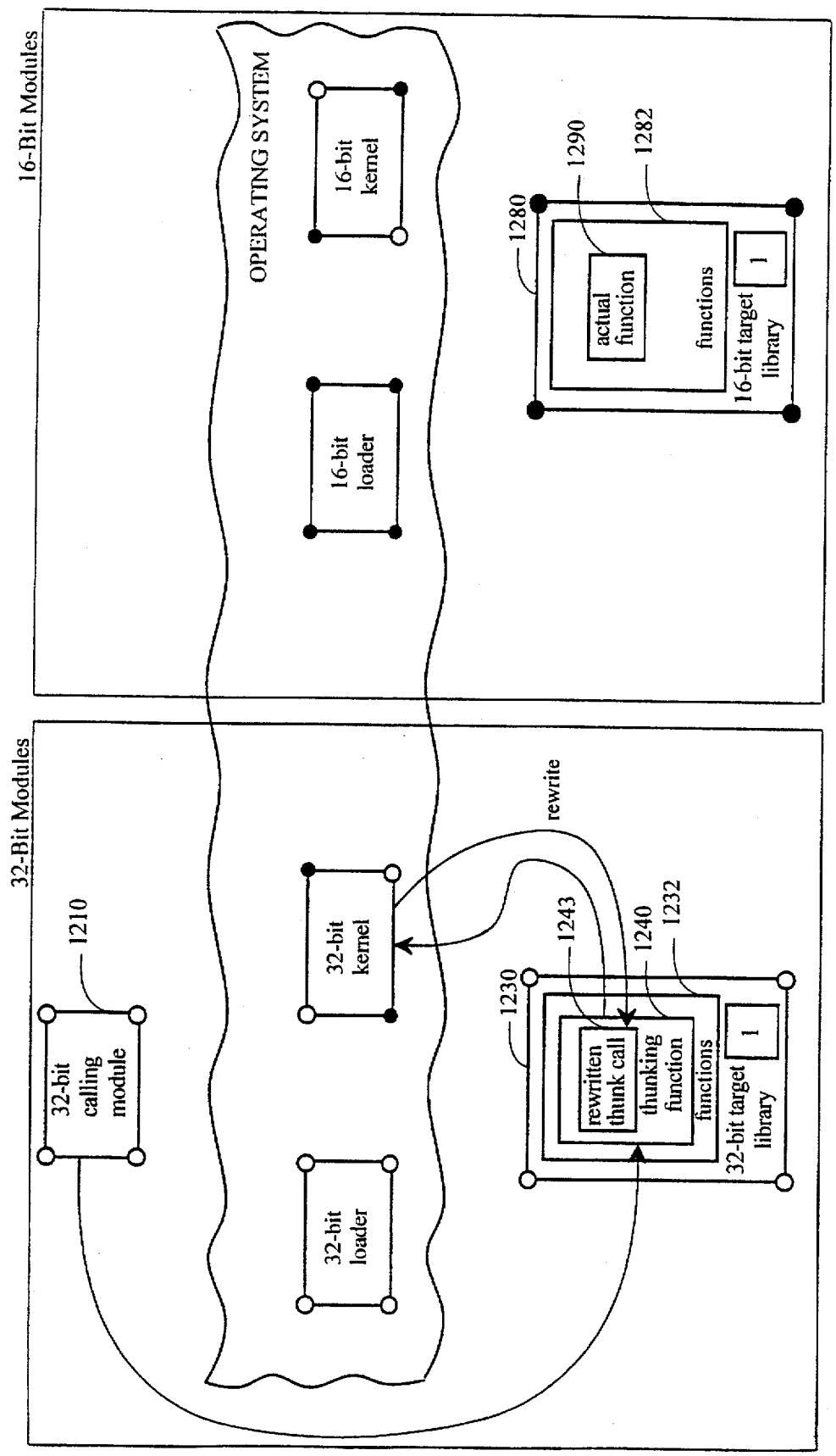
Figure 12E:
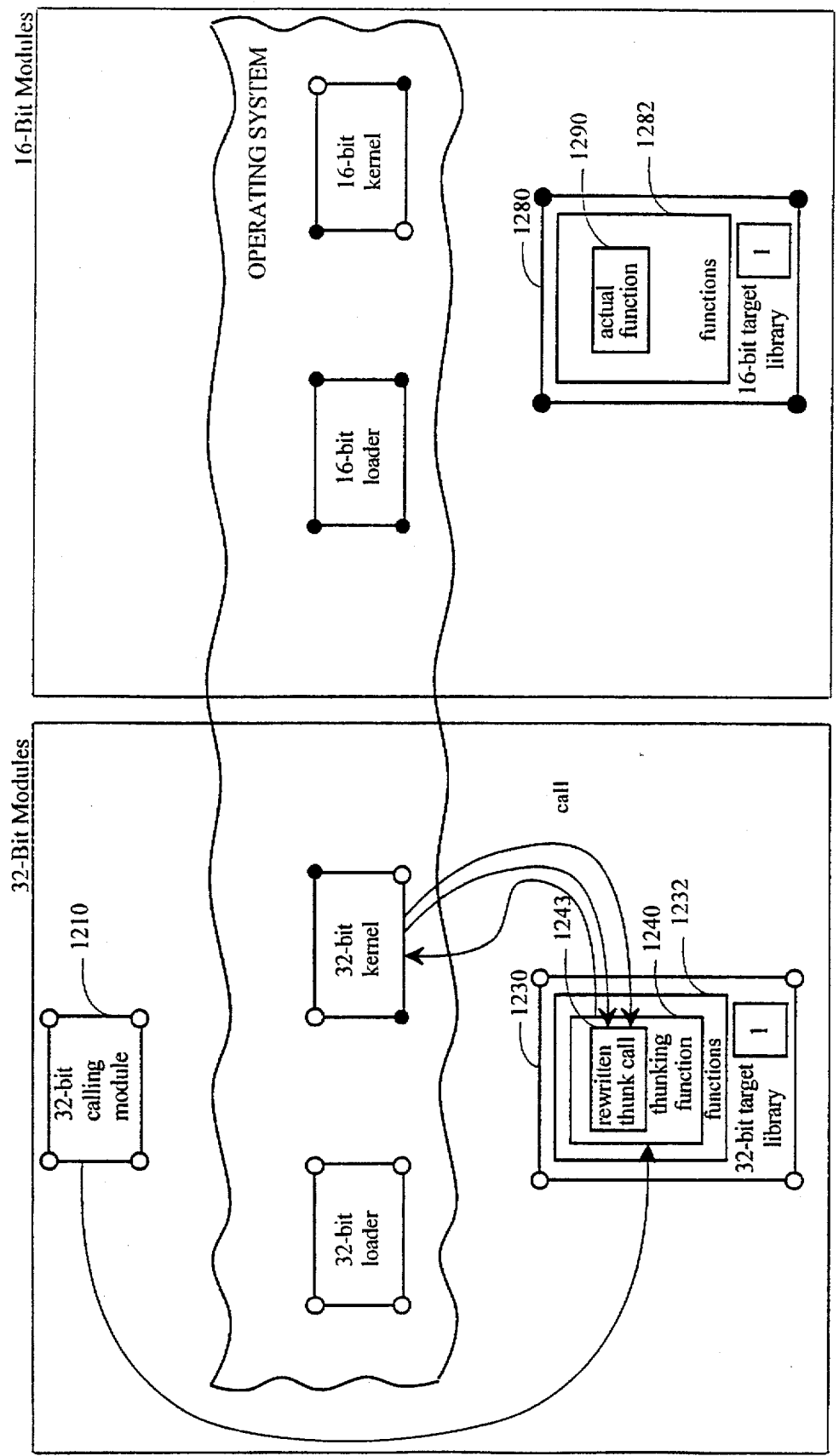

FIGS. 12C–12E illustrate the operation of the thunk call rewriting function. FIG. 12C is a memory diagram that shows that the thunk call 1241 in the thunking function 1240 in the 32-bit target library shown FIGS. 12A–12B is replaced with a call to the thunk call rewriting function of the kernel, or a "thunk call indirect," 1242. When the thunk call indirect is executed as part of the thunking function in response to the call from the 32-bit calling module, it calls the thunk call rewriting function in the 32-bit kernel. FIG. 12D shows that the thunk call rewriting function replaces the thunk call indirect 1242 of FIG. 12C with a rewritten thunk call 1243. This involves altering the contents of the 32-bit target library to contain a call to the actual function instead of a call to the thunk call rewriting function, as well as code for translating the parameters from the calling module into parameters appropriate for the other word size, and is discussed further below in conjunction with FIG. 13. FIG. 12E shows that, after rewriting the thunk call, the thunk call rewriting routine returns back to the thunking function and resumes execution at the point of the rewritten thunk call. FIG. 12F shows that, when the thunk call rewriting routine jumps back to the thunking function to execute the rewritten thunk call, the actual function 1290 is called. When the 32-bit calling module subsequently calls the thunking function 1240, the rewritten thunk call 1243 is immediately executed, calling the actual function 1290 in the 16-bit target library.

According to the invention, the library developer includes code corresponding to the pseudocode shown in Table 1A in each thunking function as the thunk call indirect. (One skilled in the art will appreciate that the number of memory locations required to perform calls and parameter translation may vary, and that the pseudocode below is an arbitrary model that must be adjusted to the actual number of memory locations required to perform calls and parameter translation.)

Figure 13:
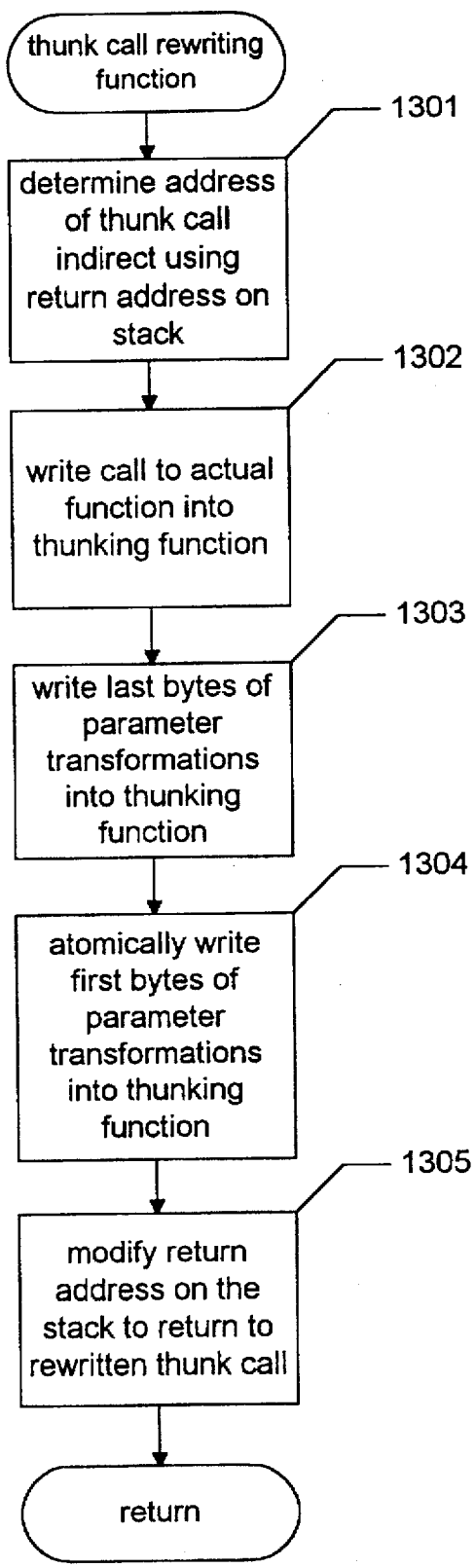
FIG. 13 is a flow diagram of the thunk call rewriting function of the each kernel.

TABLE 1A 1 jump to line 6
2 <empty>
3 <empty>
4 <empty>
5 jump to line 7
6 call thunk call rewriting function
7 return When the thunking function is called by the calling module, line 1 is executed first. The jump instruction on line 1 causes execution to jump to line 6. Line 6 calls the thunk call rewriting function of the kernel of the same word size. FIG. 13 is a flow diagram of the thunk call rewriting function of the each kernel. In step 1301, the rewriting function uses the return code pushed onto the stack by the call to the thunk call rewriting function in line 6 to determine the address in memory of the thunk call indirect by subtracting the number of bytes between lines 1 and 5. In step 1302, the rewriting function writes to the address of line 4, using the address of the thunk call indirect, bytes corresponding to a call (of the other word size) to the actual function. The thunking function is thereby changed to the contents of Table 1B.

TABLE 1B 1 jump to line 6
2 <empty>
3 <empty>
4 call actual function

TABLE 1B-continued

```
5 jump to line 7
6 call thunk call rewriting function
7 return
```

In step 1303–1304, the rewriting function writes to the addresses of lines 1–3, using the address of the thunk call indirect, bytes corresponding to the translations necessary to transform parameters in the form correct for the word size model of the calling module to the form correct for the word size model of the actual function. In step 1303, the rewriting function writes all of the bytes of the parameter transformation instructions except for a number of bytes at the beginning corresponding to the number of bytes occupied by the jump instruction of line 1. The thunking function is thereby changed to the contents of Table 1C.

TABLE 1C

```
1 jump to line 6
2 transform parameter
3 transform parameter
4 call actual function
5 jump to line 7
6 call thunk call rewriting function
7 return
```

It should be noted that the pseudocode notion of "lines" used here is an artificial one, not necessarily corresponding to either a certain number of bytes or of instructions. In fact, step 1303 may involve writing a portion of a parameter transformation instruction instead of merely whole transformation instructions. In step 1304, in an atomic operation that cannot be interrupted by other activity within the computer system, the rewriting function writes the bytes of the parameter transformation instructions not written in step 1303 to the address of the jump instruction of line 1. The thunking function is thereby changed to the contents of Table 1D.

TABLE 1D

```
1 transform parameter
2 transform parameter
3 transform parameter
4 call actual function
5 jump to line 7
6 call thunk call rewriting function
7 return
```

In step 1305, the rewriting routine modifies the return address on the stack to contain the address of line 1 instead of the address of line 7. The rewriting routine then returns, resuming execution at line 1 of the rewritten thunk call of Table 1D. The rewritten thunk call translates parameters in lines 1–3, calls the actual function in line 4 and returns, jumps to line 7 in line 5, and returns to the calling module in line 7.

The organization of the rewriting routine guarantees the reentrancy of the thunking function. That is, other threads, executing contemporaneously with the thread that executes the rewriting functions may at any time during the execution of the rewriting routine call and enter the thunking function without producing aberrant results. If the other threads execute line 1 after the atomic write of step 1304 executes, line 1 contains the first of the parameter transformations, and the other threads proceed to execute the rewritten thunk call to call the actual function. If, on the other hand, the other threads execute line 1 before the atomic write of step 1304 executes, line 1 contains a jump to line 6 (Tables 1A–1C), so the other threads jump to line 6 to harmlessly call the thunk rewriting function again, overwriting the bytes of the rewritten thunk call with the very same values.

IV. Conclusion

While this invention has been shown and described with reference to preferred embodiments, it will be understood by those skilled in the art that various changes or modifications in form and detail may be made without departing from the scope of the invention. For example, as noted above, the invention may be used to make sets of one or more routines available to programs of any two types. The invention also encompasses making routines available to programs of three or more types.

We claim:

1. A method in a computer system for calling one of a set of routines designed for direct invocation by programs of a second type when invoked by a program of a first type, comprising the steps of:

loading the program of the first type;

when the program of the first type is loaded, loading a first library;

after loading the first library, loading a second library;

after loading the second library, reloading the first library;

when the program of the first type invokes an invoked routine of the set of routines, under the control of the first library, modifying the first library to call the invoked routine in the second library when the program of the first type invokes the invoked routine;

after modifying the first library, simulating the reinvocation of the invoked routine by the program of the first type; and when the reinvocation of the invoked routine is simulated, calling the invoked routine in the second library under the control of the modified first library.

2. The method of claim 1, further including the step of, when the loaded program of the first type invokes the invoked routine of the set of routines after modifying the first library, calling the invoked routine in the second library under the control of the modified first library.

3. A method in a computer system for calling one of a set of routines designed for direct invocation by programs of a second type when invoked by a program of a second type, comprising the steps of:

loading a program of the second type;

when the program of the second type is loaded, loading a second library;

after loading the second library, loading the first library;

when the program of the second type invokes an invoked routine of the set of routines, under the control of the second library, modifying the second library to call the invoked routine in the first library when a routine of the second type invokes the invoked routine;

after modifying the second library, simulating the reinvocation of the invoked routine by a program of the second type; and when the reinvocation of the invoked routine is simulated, calling the invoked routine in the first library under the control of the modified second library.

4. The method of claim 3, further including the step of, when the loaded program of the second type invokes the invoked routine of the set of routines after modifying the second library, calling the invoked routine in the first library under the control of the modified second library.

5. The method of claim 3, further including the steps of, when the loaded program of the second type is unloaded:

unloading the first library once; and unloading the second library once.

6. The method of claim 3, further including the steps of:

when a program of the first type is loaded, reloading the first library; and when the loaded program of the first type invokes an invoked routine of the set of routines, invoking the invoked routine in the first library.

7. The method of claim 6, further including the step of, when the first library is reloaded, reloading the second library.

8. A method in a computer system for calling one of a set of routines designed for direct invocation by programs of a second type when invoked by a program of a first type, comprising the steps of:

loading a program of the first type;

when the program of the first type is loaded, loading a first library;

when the program of the first type invokes an invoked routine of the set of routines, loading a second library;

after loading the second library, reloading the first library;

when the program of the first type invokes an invoked routine of the set of routines, under the control of the first library, modifying the first library to call the invoked routine in the second library when a routine of the first type invokes the invoked routine;

after modifying the first library, simulating the reinvocation of the invoked routine by a program of the first type; and when the reinvocation of the invoked routine is simulated, calling the invoked routine in the second library under the control of the modified first library.

9. The method of claim 1, further including the steps of, when the loaded program of the first type is unloaded:

unloading the first library twice; and unloading the second library once.

10. The method of claim 1, further including the steps of:

when a program of the second type is loaded, reloading the second library; and when the loaded program of the second type invokes an invoked routine of the set of routines, invoking the invoked routine in the second library.

11. A method in a computer system for patching a segment of executable code at runtime under the control of the code segment, the code segment having a patching section and a patched section, the patching section for patching the patched section to change the contents of the patched section, comprising the steps of:

(a) when the code segment is executed a first time, under the control of a portion of the patched section, jumping from the beginning of the patched section to a point beyond the patched section and executing the patching section;

(b) when the patching section is executed, patching the patched section, comprising the substeps of:

(b)(1) patching a portion of the patched section that does not include the portion of the patched segment under the control of which step (a) is performed, and (b)(2) after step (b)(1), using a single atomic operation to patch the portion of the patched segment under the control of which step (a) is performed to instead cause the patched segment to be executed; and (c) when the code is executed after step (b), executing the patched section and preventing the patching section from being executed again.

12. The method of claim 9 wherein step (d) includes the step of patching the patched segment to prevent the patching segment from being executed again before the executable code is removed from memory and loaded again.

13. The method of claim 9 wherein the code is simultaneously executable by a plurality of threads, and wherein threads that execute the code for the performance of step (e) execute the patching code, and wherein threads that execute the code after a performance of step (e) execute the patched section.

14. A method in a computer system for pairing a first dynamic load library and a second dynamic load library, the first dynamic load library being loadable using a first loader, the second dynamic load library being loadable using a second loader, comprising the steps of:

(a) invoking the first loader;

(b) under the control of the invoked first loader, loading the first dynamic load library and executing a first initialization routine of the first dynamic load library;

(c) when the first initialization routine is executed, if no indication exists that the first loader was invoked by a second initialization routine of the second dynamic load library, invoking the second loader to load the second dynamic load library;

(d) when the second loader is invoked, loading the second dynamic load library and, if the second dynamic load library has not previously been loaded, executing the second initialization routine of the second dynamic load library; and (e) when the second initialization routine is executed, invoking the first loader to load the first dynamic load library and generating an indication that the first loader was invoked by the second initialization routine.

15. The method of claim 14 wherein step (c) includes the step of executing a first library pairing routine to invoke the second loader to load the second dynamic load library, and wherein (e) includes the step of executing a second library pairing routine to invoke the first loader to load the first dynamic load library.

16. The method of claim 14 wherein the first loader is invoked in step (a) by a thread, and wherein the step of generating an indication that the first loader was invoked by the second initialization routine includes the step of associating the indication with the thread.

17. The method of claim 14, further including the steps of:

(f) under the control of a calling program, calling a routine in the first dynamic load library;

(g) under the control of the called routine in the first dynamic load library, calling a call rewriting routine; and (h) under the control of the called call rewriting routine, modifying the called routine in the first dynamic load library to call a corresponding routine in the second dynamic load library.

18. The method of claim 17, further including the step of, after step (h), jumping to the modified called routine in the first dynamic load library in order to call the corresponding routine in the second dynamic load library.

19. The method of claim 17, further including the steps of:

(i) after step (h), under the control of the calling program, again calling the routine in the first dynamic load library; and (j) under the control of the called routine in first dynamic load library, calling the corresponding routine in the second dynamic load library.

20. The method of claim 14 wherein the computer system includes a microprocessor for executing libraries in one of a plurality of modes, and wherein the first dynamic load library is executed by the microprocessor in a first mode, and wherein the second dynamic load library is executed by the microprocessor in a second mode different from the first mode.

21. An article of computer-readable media having contents causing a computer system to pair a first dynamic load library and a second dynamic load library, the first dynamic load library being loadable using a first loader, the second dynamic load library being loadable using a second loader, by performing the steps of:

(a) invoking the first loader;

(b) under the control of the invoked first loader, loading the first dynamic load library and executing a first initialization routine of the first dynamic load library;

(c) when the first initialization routine is executed, if no indication exists that the first loader was invoked by a second initialization routine of the second dynamic load library, invoking the second loader to load the second dynamic load library;

(d) when the second loader is invoked, loading the second dynamic load library and, if the second dynamic load library has not previously been loaded, executing the second initialization routine of the second dynamic load library; and (e) when the second initialization routine is executed, invoking the first loader to load the first dynamic load library and generating an indication that the first loader was invoked by the second initialization routine.

* * * * *